(12) United States Patent
Hakemi et al.

(10) Patent No.: US 12,292,665 B2
(45) Date of Patent: May 6, 2025

(54) BISTABLE LIQUID CRYSTAL DISPERSION DEVICES COMPRISING METAL-ORGANIC MESOGENS AND APPLICATIONS THEREOF

(71) Applicant: GAUZY LTD., Tel-Aviv (IL)

(72) Inventors: Hassan Ali Hakemi, Macherio (IT); Adrian Lofer, Kfar Saba (IL); Eyal Peso, Bat Yam (IL); Dana Gal-Fuss, Tel Aviv (IL)

(73) Assignee: GAUZY LTD., Tel-Aviv (IL)

( * ) Notice: Subject to any disclaimer, the term of this patent is extended or adjusted under 35 U.S.C. 154(b) by 0 days.

(21) Appl. No.: 17/498,958

(22) Filed: Oct. 12, 2021

(65) Prior Publication Data

US 2022/0050316 A1    Feb. 17, 2022

Related U.S. Application Data

(63) Continuation-in-part of application No. 15/524,297, filed as application No. PCT/IL2015/051069 on Nov. 5, 2015, now abandoned.
(Continued)

(51) Int. Cl.
*G02F 1/1333* (2006.01)
*C09K 19/40* (2006.01)
(Continued)

(52) U.S. Cl.
CPC ............ *G02F 1/1391* (2013.01); *C09K 19/40* (2013.01); *G02F 1/1306* (2013.01);
(Continued)

(58) Field of Classification Search
CPC .... G02F 1/1391; G02F 1/1306; G02F 1/1323; G02F 1/133305; C09K 19/40; C09K 2019/0448
See application file for complete search history.

(56) References Cited

U.S. PATENT DOCUMENTS

| | | | |
|---|---|---|---|
| 4,423,191 A | 12/1983 | Haven et al. | |
| 4,934,423 A | 6/1990 | Withrow et al. | |

(Continued)

FOREIGN PATENT DOCUMENTS

| | | |
|---|---|---|
| EP | 0747461 A1 | 12/1996 |
| EP | 1372023 A2 | 12/2003 |

(Continued)

OTHER PUBLICATIONS

Yang, D.-K. et al. Control of Reflectivity and Bistability in Displays Using Cholesteric Liquid Crystals. J. Appl. Phys. 1994, 76, 1331-1333: AIP Publishing, Melville, NY.
(Continued)

*Primary Examiner* — James A Dudek
(74) *Attorney, Agent, or Firm* — The Roy Gross Law Firm, LLC; Roy Gross

(57) ABSTRACT

A bistable liquid crystal film, comprising: a first transparent flexible film coated with conductive material; a second transparent flexible film; at least one layer of liquid crystal dispersions disposed between the transparent flexible conductive films; and an ionic dopant disposed within the layer of liquid crystal dispersions. The bistable liquid crystal film is characterized as having two modes, a transparent mode and a scattering mode, with transitions between the two modes being accomplished by voltage pulses with no need to maintain a voltage across the film in order to maintain it in a particular mode. The ionic dopant is an ionic mesogen, preferably an ionic metal-organic mesogen.

23 Claims, 3 Drawing Sheets

Related U.S. Application Data

(60) Provisional application No. 62/076,002, filed on Nov. 6, 2014.

(51) Int. Cl.
*G02F 1/13* (2006.01)
*G02F 1/139* (2006.01)
*C09K 19/04* (2006.01)

(52) U.S. Cl.
CPC ...... *G02F 1/1323* (2013.01); *G02F 1/133305* (2013.01); *C09K 2019/0448* (2013.01)

(56) References Cited

U.S. PATENT DOCUMENTS

| | | |
|---|---|---|
| 4,938,568 A | 7/1990 | Margerum et al. |
| 5,459,594 A | 10/1995 | Nakanishi et al. |
| 5,631,665 A | 5/1997 | Takizawa et al. |
| 5,712,692 A | 1/1998 | Kanagawa et al. |
| 5,843,333 A | 12/1998 | Hakemi |
| 6,049,366 A | 4/2000 | Hakemi |
| 6,275,208 B1 | 8/2001 | Park |
| 6,323,929 B1 | 11/2001 | Hirakata |
| 6,722,142 B1 | 4/2004 | Pagel |
| 6,741,239 B2 | 5/2004 | Iwasaki |
| 6,819,367 B1 | 11/2004 | Cava |
| 6,982,178 B2 | 1/2006 | LeCain et al. |
| 7,091,351 B2 | 8/2006 | Dong et al. |
| 7,238,397 B2 | 7/2007 | Iftime et al. |
| 8,107,050 B2 | 1/2012 | Hsieh et al. |
| 2002/0158228 A1 | 10/2002 | Kato |
| 2004/0222814 A1 | 11/2004 | Kim et al. |
| 2005/0001954 A1 | 1/2005 | Stephenson et al. |
| 2006/0046017 A1 | 3/2006 | Adickes |
| 2006/0122532 A1 | 6/2006 | Lee et al. |
| 2007/0205394 A1 | 9/2007 | Furman |
| 2008/0187687 A1 | 8/2008 | Manabe |
| 2008/0218752 A1 | 9/2008 | Hagler |
| 2008/0263963 A1 | 10/2008 | Lee et al. |
| 2009/0151606 A1 | 6/2009 | Korber et al. |
| 2009/0273737 A1 | 11/2009 | Zhao et al. |
| 2010/0025641 A1 | 2/2010 | Jimbo et al. |
| 2010/0073605 A1 | 3/2010 | Masutani |
| 2010/0245321 A1 | 9/2010 | Ogita et al. |
| 2011/0109824 A1 | 5/2011 | Galstian |
| 2012/0068951 A1 | 3/2012 | Venkatasubramanian |
| 2012/0105424 A1 | 5/2012 | Lee et al. |
| 2012/0169987 A1 | 7/2012 | Li et al. |
| 2012/0307337 A1 | 12/2012 | Bartug et al. |
| 2013/0053468 A1 | 2/2013 | Lee et al. |
| 2013/0188105 A1 | 7/2013 | Dobrenko et al. |
| 2013/0272833 A1 | 10/2013 | Duncan et al. |
| 2013/0321744 A1 | 12/2013 | Lin et al. |
| 2013/0342773 A1 | 12/2013 | Chu et al. |
| 2014/0132909 A1 | 5/2014 | Wardhana et al. |
| 2014/0313105 A1 | 10/2014 | Peso et al. |
| 2015/0338715 A1 | 11/2015 | Schaefer et al. |
| 2017/0075152 A1 | 3/2017 | Lofer et al. |

FOREIGN PATENT DOCUMENTS

| | | | |
|---|---|---|---|
| FR | 2749450 A1 | 12/1997 | |
| JP | 6068704 A | 11/1994 | |
| WO | WO-8702693 A * | 5/1987 | ............. C07F 1/005 |
| WO | 2006014041 A1 | 2/2006 | |
| WO | 2012/042518 A1 | 4/2012 | |
| WO | 2015170318 A2 | 11/2015 | |
| WO | 2016063273 A1 | 4/2016 | |
| WO | 2016063277 A2 | 4/2016 | |
| WO | 2016071908 A1 | 5/2016 | |

OTHER PUBLICATIONS

Neve, F. Transition Metal Based Ionic Mesogens. Adv. Mater. 1996, 8, 277-289: Wiley-VCH Verlag GmbH, Weinheim, Germany.

Dozov, I. et al. Fast Bistable Nematic Display Using Monostable Surface Switching. Appl. Phys. Lett. 1997, 70, 1179-1181: AIP Publishing, Melville, NY.

Donnio, B.; Bruce, D. W. Metallomesogens. Struct. Bond. 1999, 95, 194-247: Springer Verlag, Berlin, Germany.

Jess, F.M. Halo- and Organogold(I) Complexes as Potential Metallomesogens. M. Sc. Thesis, University of Cape Town: Rondebosch, South Africa, 1999.

Bruce, D. W. Calamitics, Cubics, and Columnars—Liquid-Crystalline Complexes of Silver(I). Acc. Chem. Res. 2000, 33, 831-840: American Chemical Society, Washington, DC.

Dierking, I. Polymer Network-Stabilized Liquid Crystals. Adv. Mater. 2000, 12, 167-181: Wiley-VCH Verlag GmbH, Weinheim, Germany.

Büyüktanir, E.A. et al. Flexible Bistable Smectic-A Polymer Dispersed Liquid Crystal Display. Jpn. J. Appl. Phys. 2006, 45, 4146-4151: IOP Publishing Ltd., Tokyo, Japan.

Marshall, K. L. et al. Transition Metal Dithiolene Near-IR Dyes and Their Applications in Liquid Crystal Devices. LLE Rev. 2006, 106, 112-128: University of Rochester Laboratory for Laser Energetics, Rochester, NY.

Pucci, D., et al. Tailoring 'Non Conventional' Ionic Metallomesogens Around an Ortho-Palladated Fragment. J. Organomet. Chem. 2006, 691, 1138-1142: Elsevier BV, Amsterdam, The Netherlands.

Büyüktanir, E.A. Electro-Optical Characterization of Bistable Smectic A Liquid Crystal Displays. Ph. D. Thesis, Kent State University, Kent, OH, May 2008.

Yazaki, S. et al. Nanostructured Liquid Crystals Combining Ionic and Electronic Functions. J. Am. Chem. Soc. 2010, 132, 7702-7708: American Chemical Society, Washington, DC.

Axenov, K. V.; Laschat, S. Thermotropic Ionic Liquid Crystals. Materials 2011, 4, 206-259: MDPI, Basel, Switzerland.

Cuerva De Alaíz, C. Advanced molecular materials based on novel Pd(II) and Pt(II) metallomesogens for technological applications. Ph. D. Thesis, Universidad Complutense de Madrid: Madrid, Spain, 2018.

Wikipedia, "Dimmer", https://en.wikipedia.org/wiki/Dimmer, last edited Mar. 11, 2017.

Okatani T. et al., "Study of image quality of superimposed projection using multiple projectors", IEEE Trans Image Process, vol. 18(2), Feb. 2009.

PCT International Search Report for International Application No. PCT/IL2015/051069, dated Apr. 7, 2016, 4pp.

PCT Written Opinion for International Application No. PCT/IL2015/051069, completed Feb. 11, 2016, 6pp.

Supplementary European Search report for European Application No. 15857433.5 completed Apr. 25, 2018, 12pp.

Flexible Bistable Smectic-A Liquid Crystal Device Using Photolithography and Photoinduced Phase Separation Advances in Condensed Matter Physics, vol. 2012, Article ID 843264, 9 pages; Retrieved Oct. 12, 2021; doi:10.1155/2012/843264.

Buyuktani et al., Flexible Bistable Smectic—A Polymer Dispersed Liquid Crystal Display, Japanese Journal of Applied Physics, vol. 45, No. 5A, 2006, pp. 4146-4151; Retrieved Oct. 12, 2021; doi:10.1143/jjap.45.4146.

Hao Wang et al., Information Recording Materials, "Research progress of bistable liquid crystal display technology" vol. 12 Issue 6, pp. 26, published on Dec. 15, 2011.

\* cited by examiner

BISTABLE LIQUID CRYSTAL DISPERSION DEVICES COMPRISING METAL-ORGANIC MESOGENS AND APPLICATIONS THEREOF

REFERENCE TO RELATED PUBLICATIONS

This application is a Continuation-in-Part of U.S. patent application Ser. No. 15/524,297, filed 4 May 2017, which is a U.S. National Phase entry of PCT (International) Pat. Appl. No. PCT/IL2015/051069, filed 5 Nov. 2015, and which claims priority from U.S. Provisional Pat. Appl. No. 62/076,002, filed 6 Nov. 2014. All of these applications are incorporated by reference in their entirety.

FIELD OF THE INVENTION

The present invention relates to liquid crystal devices in general and, more specifically, to bistable liquid crystal devices that comprise ionic mesogens, preferably ionic metal-organic mesogens and eutectic mixtures thereof, as ionic dopants.

BACKGROUND OF THE INVENTION

U.S. Pat. No. 8,107,050 discloses a display material and method and device thereof are provided. The display material is first formed by evenly mixing appropriate weight ratios of DFLCs, incurable nanoparticles, curable nanoparticles, and a photoinitiator. Next, the evenly mixed mixture is disposed between two parallel conducting transparent substrates, wherein an electrical field is conducted thereto and the DFLCs therein aligned to the direction of the applied electrical field. Concurrently, under the applied electrical field, some curable nanoparticles within the evenly mixed mixture, form short nano chains, initiating the photo initiator. The frame structure of short nano chains stabilize both the clear and scattering states, thereby the bistable characteristic was improved and the contrast ratio was enhanced as applied to bistable displays. As mentioned in the patent, "The well dispersed mixtures with photo initiator (1369, commercially available from Ciba) were melted and placed between two ITO glasses to be fabricated as a cell without any alignment treatment."

U.S. Pat. No. 7,238,397 discloses a cholesteric display that includes a bistable liquid crystalline mixture contained between a first substrate and a second substrate of a liquid crystal (LC) cell, and a polymer network orthogonally oriented with respect to the substrates, thereby defining liquid crystal domains, with a dipolar dopant dissolved in the liquid crystalline mixture. A process for producing a cholesteric display is also provided. Also in this patent the following is mentioned: "The resulting cholesteric mixture is sandwiched between two indium-tin-oxide (ITO) coated glass slides for the substrates".

U.S. Pat. Appl. Pub. No. 20130342773 discloses liquid crystal compositions having a smectic structure, cells containing such a composition sandwiched between a pair of electrodes, an optical device containing one or more multiple cells and a method of switching the optical properties of the composition by applying an electric field thereto. In the patent the following is described: "The application of wires to contact the conducting glass allows a field to be applied across the liquid crystal layer."

Efforts have been made to optimize the manner in which one can control electromagnetic radiation passing through a window, e.g., in residences, commercial buildings, automobiles, etc. Such control may be to provide privacy, reduce glare from ambient sunlight, or to control harmful effects of ultraviolet light. Technology associated with such light control has evolved significantly over the conventional window shade or blind.

One approach to electromagnetic radiation control uses passive films, such as high reflectivity films, heat saving films, and fade-protection films. However, such films generally result in a constant reduction in interior light and loss in visibility. Another approach uses glass panels having radiation transmission characteristics that absorb infrared and ultraviolet wavelengths, while transmitting visible wavelengths.

Further approaches to electromagnetic radiation control use "smart window" technology, wherein light transmission characteristics may be electrically controlled in order to meet lighting needs, minimize thermal load on heating and/or cooling systems, provide privacy within interior spaces of buildings, vehicles and the like, or control harmful effects associated with ultraviolet light exposure.

There are two general categories of chromogenic switchable glazing or smart windows, namely: non-electrically activated switchable glazings and electrically activated switchable glazings. The non-electrically activated types of chromogenic switchable glazing are based on photochromies, thermochromics and thermotropics. The most common electrically activated types of chromogenic switchable glazing are based on polymer dispersed liquid crystals (PDLC), dispersed particle systems (DPS) and electrochromics.

In general, PDLC technology involves phase separation of nematic liquid crystal from a homogeneous liquid crystal containing droplets in a polymer matrix. The phase separation can be realized by polymerization of the polymer. The phase separated nematic liquid crystal forms micro-sized droplets dispersed in the polymer bed. In the off-state, the liquid crystal molecules within the droplets are randomly oriented, resulting in mismatching of the refractive indexes between the polymer bed and the liquid crystal droplets and hence a translucent or light scattering state. When a suitable electric field is applied, the liquid crystal orients such that the refractive indexes between the polymer bed and the liquid crystal droplets are oriented such that a transparent state results. The main disadvantage of the PDLC technology is the inherent haze caused by the optical index mismatching, particularly at large viewing angles. The application of an applied voltage is also necessary to resistance stability.

Electro-optical laminate structures having total-reflection, semi-transparent and totally transparent modes of operation for improved control over the flow of electromagnetic radiation have been developed. Such structures comprise one or more cholesteric liquid crystal (CLC) electromagnetic radiation polarizing panels, also known as polymer stabilized cholesteric texture (PSCT) liquid crystal technology.

PSCT polarizers are used in light valves and electro-optical glazing, or smart window constructions to control light. Such constructions typically comprise two rigid sheets of glass on either side of the CLC layer. The CLC layer comprises crosslinkable or polymerizable material mixed with non-crosslinkable liquid crystals and chiral dopants. Each sheet of glass is covered with a transparent, electrically conductive coating to which electrical connections are attached. The structure is typically mounted within a frame.

PSCT generally may be formed in "normal" mode, "reverse" mode, or bistable mode. In the normal mode, the liquid crystals are in a focal conic state and scatter light. If an electric field is applied to the PSCT device, it reorient themselves parallel to each other along with the electric field and the panel appears transparent, allowing light to pass through the device without scattering of the light.

"Reverse mode" PSCT is similar to the normal mode PSCT product, but with some key differences. The PSCT panel is transparent at zero field and scattering/opaque when a sufficiently high field is applied. Further, an additional orientation layer is generally applied to the substrates before lamination of the liquid crystal mixture. During curing of the panel, which is typically slower than for normal mode product, no electric field is applied to the mixture. Also, the formulation is a modified liquid crystal mixture, and includes higher polymer concentration. Reverse mode PSCT are particularly suitable for automotive type applications when a fail-safe state must be transparent. It is also preferred for use when the main duty of the glazing structure is to act as a transparent window.

Bistable PSCT systems operate in a different manner, whereby a voltage is applied to switch from a scattering/opaque state to a transparent state, and vice versa. At one voltage condition, the material is opaque or optically scattering, because the liquid crystal is randomly oriented as focal conic texture throughout the system, and thus the refractive indices vary spatially. At another voltage condition, the material is transparent, because the liquid crystal is uniformly aligned and the material becomes an optically uniform medium. Although liquid crystals are dielectric media, their conductivities are not zero because of impurities. Switchable windows prepared with PDLCs and PSCTs consume generous amounts of energy since a voltage must be applied in order to sustain one of the optical states. Thus, current liquid crystal switchable windows have a problem in that voltage must be applied to sustain one of the optical states, namely, they are monostable.

Another approach to bistable liquid crystal devices has been the use of ion-doped smectic-A devices. For example, West and coworkers (Büyüktanir, E. A.; Mitrokhin, M.; Holter, B.; Glushchenko, A.; West, J. L. *Jpn. J. Appl. Phys.* 2006, 45, 4146-4151) have disclosed a bistable PDLC device that incorporates an ion-doped smectic-A liquid crystal/polymer composite. Neither the identities nor the concentrations of the ion dopants used in the devices were described in detail.

A bistable LC device with improved optical properties and that uses less energy than those known in the art thus remains a long-felt, but as yet unmet, need.

SUMMARY OF THE INVENTION

The instant invention is designed to meet this long-felt need. It is therefore an object of the present invention to disclose a bistable liquid crystal film, comprising: (a) at least one first transparent flexible film coated with conductive material; (b) at least one second transparent flexible conductive film; (c) at least one layer of liquid crystal dispersions disposed between said at least one first transparent flexible transparent conductive film and said at least one second transparent flexible conductive film; and, (d) an ionic dopant disposed within said at least one layer of liquid crystal dispersions, wherein: said bistable liquid crystal film is characterized by two modes, (i) scattering mode-A; and (ii) transparent mode-B; switching from one mode to the other is achieved upon application of a voltage pulse, and no further application of voltage is required in order to maintain said layer of liquid crystal dispersions in either said two modes; and, said ionic dopant comprises at least one ionic mesogen.

It is a further object of this invention to disclose the bistable liquid crystal film defined above, wherein said liquid crystal dispersion is selected from the group consisting of a smectic A composition; a nematic composition; a cholesteric composition; and, any combination thereof.

It is a further object of this invention to disclose the bistable liquid crystal film as defined in any of the above, wherein at least one of the following is true: (a) switching from said mode-A to said mode-B is achieved upon application of a high frequency voltage pulse; and, (b) switching from said mode-B to said mode-A is achieved upon application of a low frequency voltage pulse.

It is a further object of this invention to disclose the bistable liquid crystal film as defined in any of the above, wherein said bistable liquid crystal film comprises electrical connections attached to said each of said transparent films.

It is a further object of this invention to disclose the bistable liquid crystal film as defined in any of the above, wherein said liquid crystal dispersion is characterized by a liquid crystal dispersion morphology in polymer matrix selected from the group consisting of nano-droplets, micro-droplets, macro-droplets and polymer network.

It is a further object of this invention to disclose the bistable liquid crystal film as defined in any of the above, wherein said bistable liquid crystal film comprises a liquid crystal composition selected from the group consisting of Polymer Dispersed Liquid Crystal (PDLC), Polymer Stabilized Liquid Crystal (PSLC), Polymer Network Liquid Crystal (PNLC), and Polymer Stabilized cholesteric Texture (PSCT).

It is a further object of this invention to disclose the bistable liquid crystal film as defined in any of the above, wherein aid bistable liquid crystal film comprises a figure selected from the group consisting of patterns, a low-definition displays, and signage.

It is a further object of this invention to disclose the bistable liquid crystal film as defined in any of the above, wherein said liquid crystal film comprises at least one component selected from the group consisting of dichroic organic dyes, dichroic metal-organic dyes, and dichroic organic dyes.

It is a further object of this invention to disclose the bistable liquid crystal film as defined in any of the above, wherein said bistable liquid crystal film comprises a component selected from the group consisting of (a) metallized films adapted for use in a static solar-reflection mode; and (b) broad-band cholesteric materials adapted for use in a dynamic solar-reflection mode.

It is a further object of this invention to disclose the bistable liquid crystal film as defined in any of the above, wherein said ionic dopant is present in a concentration of 1-10-% (w/w) relative to said liquid crystal dispersion.

It is a further object of this invention to disclose the bistable liquid crystal film as defined in any of the above, wherein said ionic mesogen is a metal-organic mesogen; said metal-organic mesogen comprises at least one chromophoric group and is characterized by at least one absorption band in the visible spectrum; and, said metal-organic mesogen acts as both an ionic dopant and as a dye.

It is a further object of this invention to disclose the bistable liquid crystal film as defined in any of the above, wherein said at least one ionic mesogen comprises a eutectic mixture selected from the group consisting of eutectic mixtures of ionic mesogens; eutectic mixtures of ionic organometallic liquid crystals; eutectic mixtures of ionic organometallic liquid crystals and their ligands; and eutectic mixtures of ionic organometallic mesogens and conventional liquid crystals.

It is a further object of this invention to disclose the bistable liquid crystal film as defined in any of the above, wherein said flexible transparent conductive film is coated with a reflectivity enhancer.

It is a further object of this invention to disclose a method of preparing a bistable switchable liquid crystal device, said method comprising:
providing two transparent flexible substrates, each of which is coated with a transparent conductive layer;
placing said two transparent flexible substrates opposite one another;
optionally, separating said two transparent flexible substrates, thereby creating a volume therebetween;
preparing a dispersion comprising at least one liquid crystal material, a monomer that is polymerizable on irradiation or heating, and at least one ionic mesogen;
introducing said dispersion between said substrates; and,
polymerizing said polymerizable monomer in the presence of an external electric field, thereby forming a polymer matrix.

It is a further object of this invention to disclose the method of preparing a bistable switchable liquid crystal device as defined above, wherein said at least one ionic mesogen comprises at least one ionic metal-organic mesogen.

It is a further object of this invention to disclose the method of preparing a bistable switchable liquid crystal device as defined in any of the above, wherein said at least one ionic mesogen comprises a eutectic mixture of ionic mesogens into said liquid crystal dispersion, said eutectic mixture selected from the group consisting of eutectic mixtures of ionic mesogens; eutectic mixtures of ionic organometallic liquid crystals; eutectic mixtures of ionic organometallic liquid crystals and their ligands; and eutectic mixtures of ionic organometallic mesogens and conventional liquid crystals.

It is a further object of this invention to disclose the method of preparing a bistable switchable liquid crystal device as defined in any of the above, wherein said dispersion comprises 1-10% (w/w) of said at least one ionic mesogen.

It is a further object of this invention to disclose the method of preparing a bistable switchable liquid crystal device as defined in any of the above, wherein said liquid crystal dispersion is selected from the group consisting of a smectic A composition; a nematic composition; and a cholesteric composition.

It is a further object of this invention to disclose the method of preparing a bistable switchable liquid crystal device as defined in any of the above, wherein said method comprises attaching electrical connections to said transparent films. In some preferred embodiments of the method, said method comprises connecting said bistable liquid crystal film to a controller, said controller configured to be connected to a device selected from the group consisting of smart home systems, wireless devices, and personal computers.

It is a further object of this invention to disclose the method of preparing a bistable switchable liquid crystal device as defined in any of the above, wherein said method comprises coating at least one of said flexible conductive films with a reflectivity enhancer.

The bistable liquid crystal film can be made by the following compositions: smectic, nematic or cholesteric. The bistable liquid crystal film is characterized by having a reverse morphology. Furthermore, the bistable liquid crystal film is characterized by having or not having a memory effect. In case the film has memory effect, then the film is periodically subjected to an electrical impulse from the source to maintain the transparency or opacity of the film. The bistable liquid crystal film switch from mode A to mode B is achieved upon application of a high frequency voltage pulse; and from said mode B to said mode A is achieved upon application of a low frequency voltage pulse. Also, no further amount of voltage to the device is required in order to maintain either said mode A nor said mode B. The bistable liquid crystal film is characterized by a liquid crystal dispersion morphology in polymer matrix of nano-droplets, micro-droplets, macro-droplets or network gel. The bistable liquid crystal film could be made by phase separation methods or by micro-encapsulation methods. The bistable liquid crystal film comprises spacers. The bistable liquid crystal film may comprise one flexible transparent conductive support that contains a pattern or signage. The bistable liquid crystal film is characterized by the possibility of containing dichroic organic and metal-organic dye. The bistable liquid crystal film is characterized by the possibility of containing nematic mixtures for static solar-reflection mode. The bistable liquid crystal film is characterized by the possibility of containing broad-band cholesteric materials for dynamic solar-reflection mode. The bistable liquid crystal composition can be PDLC, PNLC, PSCT or other. The bistable liquid crystal film is a flexible electrooptical liquid crystal device. The flexible transparent conductive film can be coated with a reflectivity enhancer. The bistable liquid crystal film comprises a pattern or a low-definition display or signage.

A method of preparing a bistable switchable liquid crystal device, the method comprising the steps of: providing a dispersion comprising at least one liquid crystal material; introducing said mixture into a cell comprising a first and second transparent flexible films coated with conductive material, and curing the cell to form a polymer matrix in the presence of a UV or electron-beam radiation, heat or by solvent evaporation; wherein said step (a) further comprises introducing metal-organic mesogens into the liquid crystal dispersion.

These and other advantages and novel features, as well as details of an illustrated embodiment of the present invention, will be more fully understood from the following description and drawings.

DETAILED DESCRIPTION OF THE INVENTION

Figure 1:
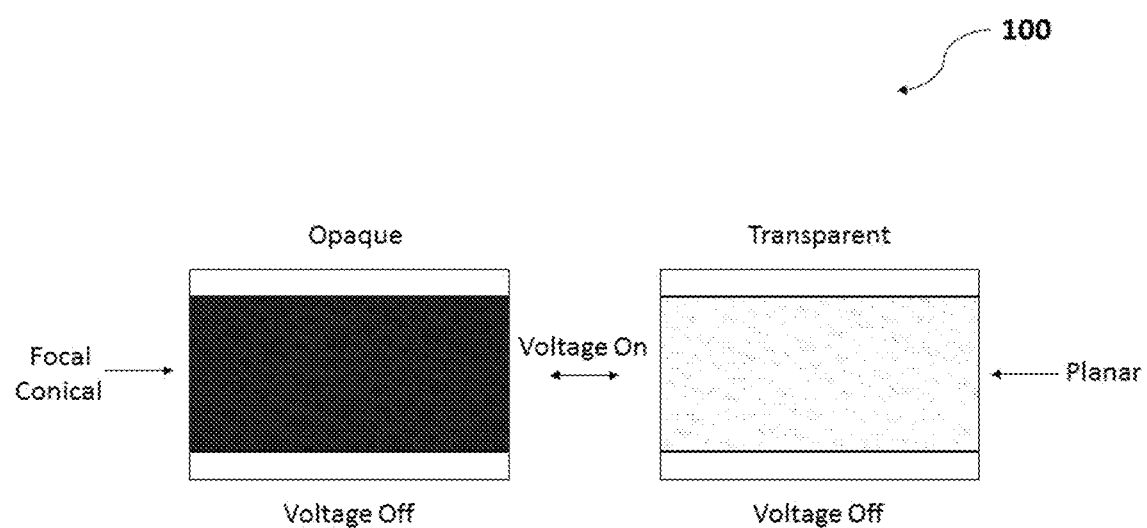
FIG. 1 presents a schematic representation of a device known in the prior art.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not to be construed as being limited by that which is illustrated in the figures and described in the specification, but only as indicated in the accompanying claims, with the proper scope determined only by the broadest reasonable interpretation of said claims.

In some cases, for clarity or conciseness, individual elements of the invention are discussed separately in the specification. Nonetheless, any combination of elements of the invention disclosed herein that is not self-contradictory is considered by the inventors to be within the scope of the invention, whether or not that specific combination of elements is explicitly described.

In all cases in which a composition or method is described herein as "comprising" a set of steps or components (i.e. contains at least the listed steps or components), it is to be understood that embodiments that "consist of" the listed steps or components (i.e. contain those steps or components and no others) are considered by the inventors to be within the scope of the invention. In addition, when the invention or a component or method step thereof is described in terms of selection from a group of alternatives, any subset of that group is considered by the inventor to be within the scope of the invention.

All prior art documents cited herein are incorporated in their entirety by reference.

As used herein, the terms "metal-organic mesogen," "metallomesogen," and "MOM" are used interchangeably to describe a mesogenic compound or composition that contains at least one metal atom or ion.

As used herein, the term "retrofit (ting)" refers to the modification of a conventional window or surface by combining the same in some manner with an enhancement, i.e., a switchable glazing, non-switchable light modulating device, etc.

Metal Organic Mesogens and Metal Organic Mesogen Dyes

The structure of the organometallic liquid crystal compound comprise a metal bonded multi-aromatic unit of at least two aromatic groups covalently joined, either directly or through other polyvalent organic or inorganic connecting groups. Generally, there are at least two multi-aromatic units bonded to the metal. Illustrative of such a structure is the following:

$$R^1\text{—}R^2\text{—}R^3 \tag{1}$$

where $R^1$ and $R^3$ are the same or different moieties, each of which provides at least one covalently joined aromatic group (aromatic groups include the unsaturated heterocyclic structures), and $R^2$ contains a polyvalent metal, bonded to $R^1$ and $R^3$ by covalent, ionic or weaker bonding forces. $R^2$ may contain a ring atom of a saturated structure or an unsaturated heterocyclic structure and thus constitutes part of the aromaticity of the composition.

The metals included are vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, rare earth metals, or uranium, and the like. The compound (1) may be an anionic or cationic component of a salt in which the counter-ion is a structure that does not adversely affect the liquid crystal properties of compound (1) or combines with compound (1) to provide the liquid crystal properties.

Particularly preferred organometallic liquid crystal compositions useable in the practice of this invention comprise those of the formula:

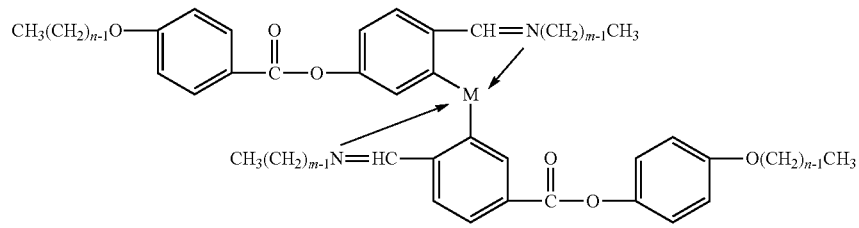

(2A)

in which M is copper, nickel, vanadyl oxide and palladium and n and m are positive numbers such that compound (2) is a liquid crystal, and preferably nematogenic. In general, n and m each have a value of 2 to about 15, sufficient that the compound is mesogenic, preferably such that the compound possesses enantiotropic, monotropic, smectic, nematic and/or cholesteric phases. These compositions are described by Caruso, et al., Liquid Crystals, 1990, vol. 7, no. 3, pp. 421-430 and Liquid Crystals, 1991, vol. 10, no. 1, pp. 85-93.

Similar mesogens have the following formulae:

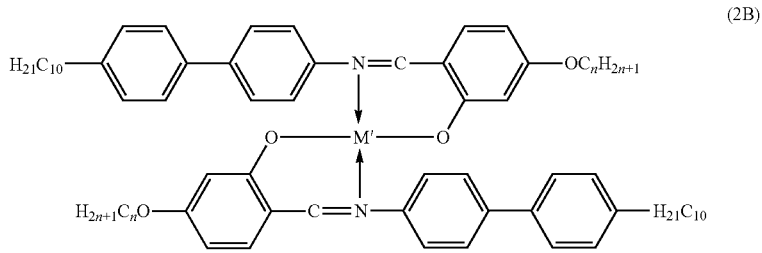

(2B)

where n is defined above, and M' is oxyvanadium and platinum. See Sadashiva, et al., Abstract, International LCC, Pisa, Italy, 1992, A-P16, p. 38.

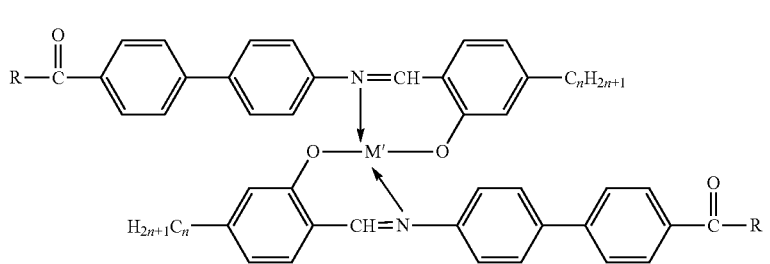

(2C)

where R is organo such as aryl, alkyl, alkoxyaryl and the like, and n is defined above. M is defined above, and is preferably copper.

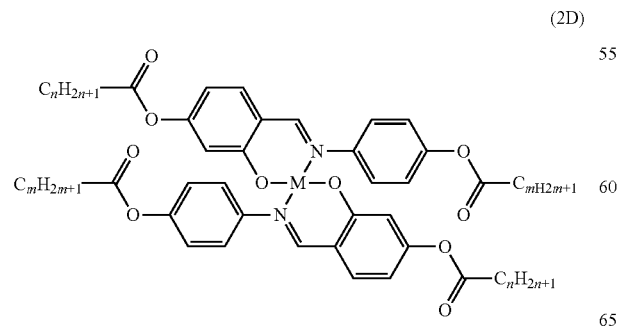

(2D)

Another compound is described by Giroud-Godquin and Maitlis, supra, at pages 394-395, of the formula:
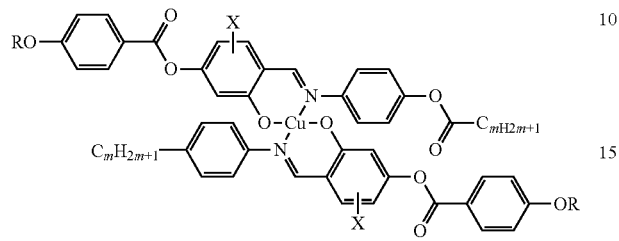
(2E)
where R is alkyl ($C_{1-20}$)) m is 1-20, and X is alkyl ($C_{1-4}$). Similar compounds are described by Giroud-Godquin and Maitlis, supra, at pages 395-396, of the formulae:
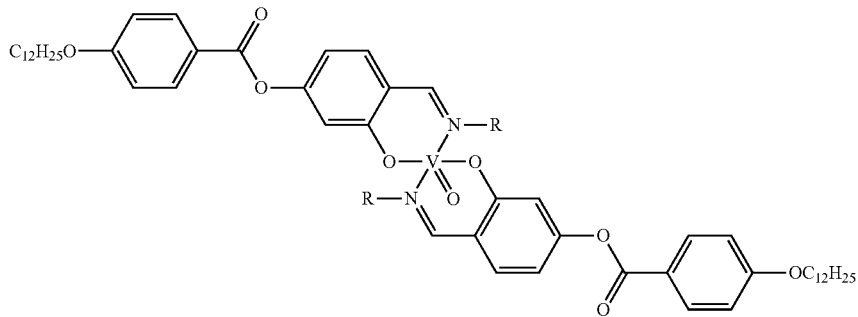
(2F)
and
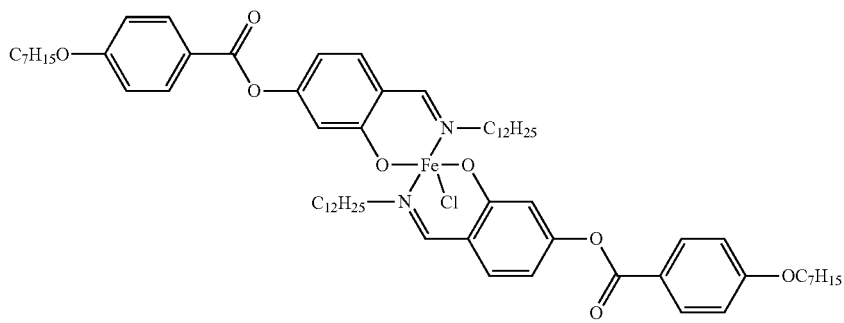
(2G)

In summary of the compounds of formula (2), M is copper, nickel, vanadyl oxide and palladium and n and m are positive numbers of a value such that the compound is a liquid crystal, M' is oxyvanadium and platinum, R is aryl, alkyl and alkoxyaryl and X is alkyl.

Another preferred organometallic liquid crystal compositions useable in the practice of this invention relates to a class of liquid crystal compounds formed by ionic interaction of mesogenic cations with mesogenic anions. Either may contain a metal. One type can be represented by the general formula (3):

$$L_2MX_2 \tag{3}$$

where L represents an organo-nitrogen mesogen, M is defined above, X represents halide. (See Maitliss, et al. WO87/02693, Publ'd: May 7, 1987) Preferred embodiments of compounds (3) are obtained when the metal is palladium or platinum. Other organometallic mesogens suitable in practicing the invention are those represented by the general formulae (4) and (5):

$$LRh(CO)_2X \tag{4}$$

$$LAuX \tag{5}$$

where L and X are defined above (see Bruce, et al., J. Chem. Soc, Chem. Comm., 1985, 581; Adams, et al., Liquid Crystal, 1987, 2, 38).

Other suitable ionic mesogens are encompassed by the formulae (6)-(8):

$$[L_2Ag]^+BF_4^- \tag{6}$$

$$[L_2Ag]^+Y^- \tag{7}$$

$$X^+Y^- \tag{8}$$

where L is as defined above, Y⁻ is a mesogenic anion and X⁺ is a mesogenic cation. Another class of organometallic mesomorphic compound is represented by the formula (9):

$$[(R^4COO)_4M_2] \tag{9}$$

where $R^4$ represents an alkyl or aryl group, for example $C_{11}H_23$ and M is as defined above. Methods for making these organometallic mesogens are described by Maitliss, et al. WO87/02693, published May 7, 1987.

An additional class of preferred organometallic liquid crystal compounds is complexes of the formula:

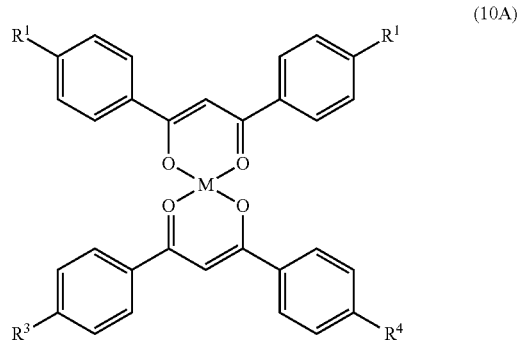

(10A)

where $R^{1-4}$ are the same or different alkyl ($C_{1-30}$), alkoxy ($C_{1-30}$), aryloxy or cyano groups, and M is described above. A description of these compounds is set forth in, Chemical Abstracts, 97:6461k and by Giroud-Godquin in French Patent 2,486,946.

The same author, (CA, 91:177447F) and French Patent 2,393,839, describes compounds of the formula:

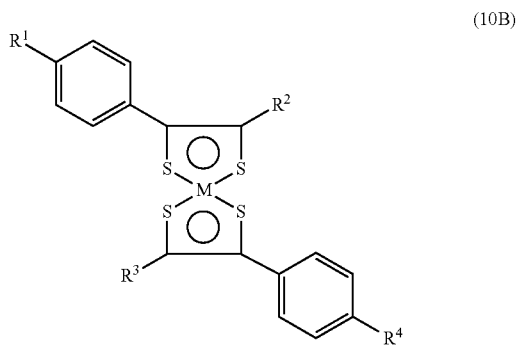

(10B)

where $R^{1,4}$ are the same or different alkyl ($C_{1-14}$), alkoxy ($C_{1-14}$) or aryl groups, $R^{2,3}$ are hydrogen or the same or different alkyl ($C_{1-4}$) groups and M is described above where R is alkyl, alkoxy or aryl, R' is H or alkyl, M is described above, preferably platinum, cobalt or vanadium. In that same family of compounds is the mesomorphic transition metal complexes of the formulae:

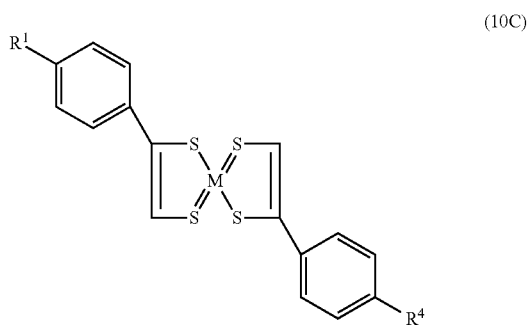

(10C)

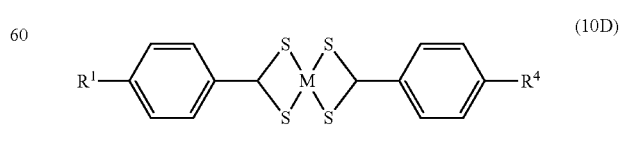

(10D)

where $R^{1,4}$ and M are defined above. See Bruce, et al., J. Mater. Chem., 1991, 1 (5), 857-861.

Another class of desirable organometallic mesogens for use in the practice of the invention disclosed herein has the formula:

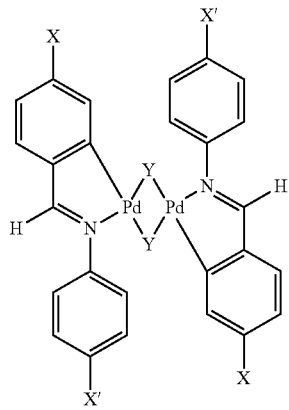
(11A)

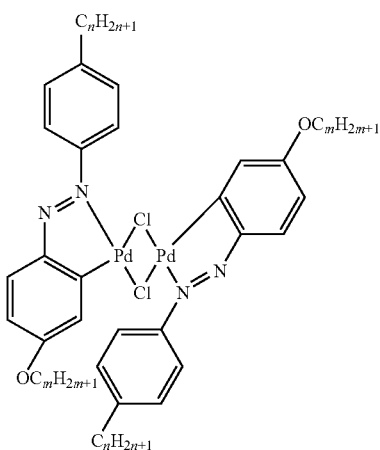
(11B)

where Y is halogen, preferably chlorine, X is hydrogen, alkyl ($C_{1-14}$), alkoxy ($C_{1-14}$), halogen (preferably chlorine, bromine or iodine), cyano, nitro, and the like, and X' is alkyl ($C_{1-14}$) or alkoxy ($C_{1-14}$). These compounds are generally described in Ros, et al., Liquid Crystal, 1991, vol. 9, no. 1, 77-86, and Ghedini, et al., *Materials,* 1992, 4, pp. 1119-1123.

Also included are the benzenedithiol metal complex of the formula, which can act as IR-absorptive structures:

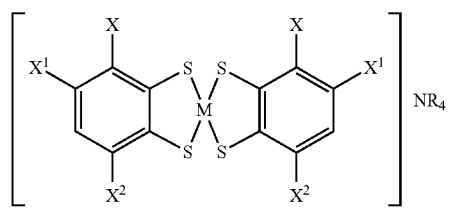
(12)

where M is Ni, Pd or Pt, X is Cl or Br, $X^-$ and $X^2$ are H or Cl when X is Cl and H· or Br when X is Br, and R is $C_{1-14}$ alkyl. See Saito, et al., CA, 105: 2168 Hz and U.S. Pat. No. 4,508,655.

Giroud-Godquin and Maitlis, supra, at pages 397 and 398, describe another useful class of organometallic liquid crystal compounds suitably employable in the practice of the invention. One class is characterized by the formula:

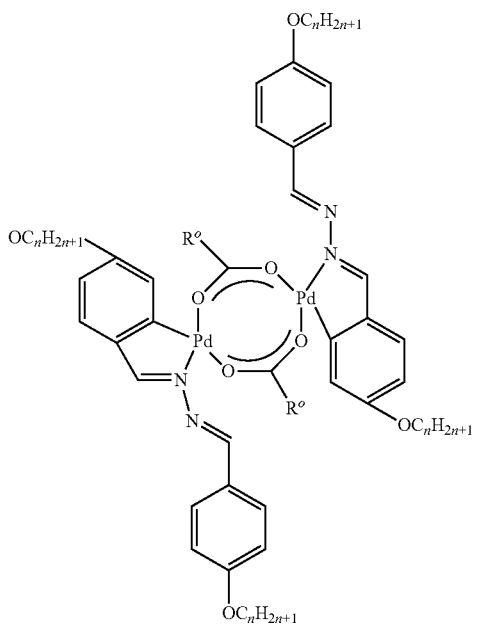
(14)

where $R^o$ is

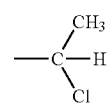

or $OC_mH_{2m+1}$, and m is 1 through 20.

Another series of MOMs are described by Versace et al., Mol. Cryst. Liq. Cryst. 1992, vol. 212, pp. 313-318, having the formulae:
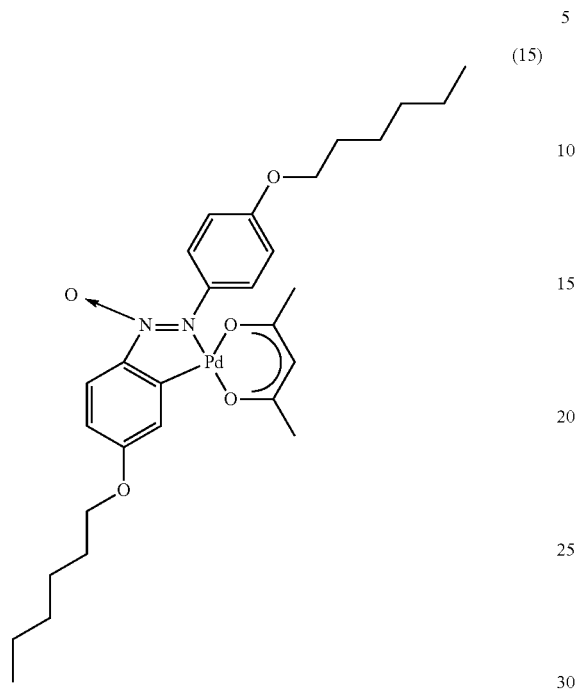
(15)
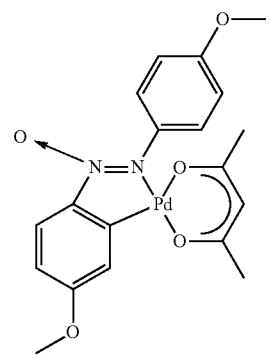
(17)
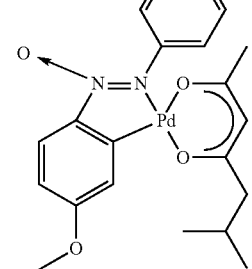
(16)
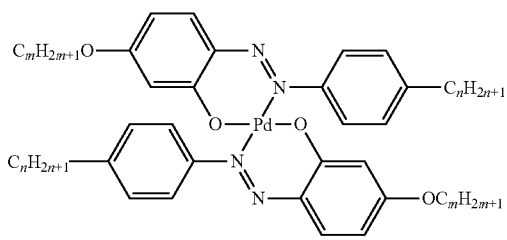
(18)
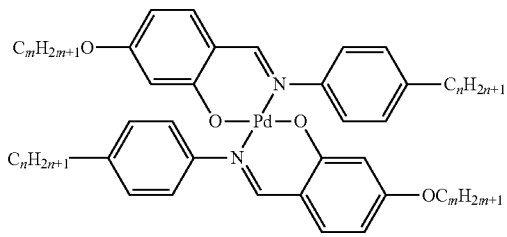
(19)
(20)
where n and m are whole numbers having a value of 1-20.

Another series of MOMs are copper complexes of phenacyl pyridines having the formula:

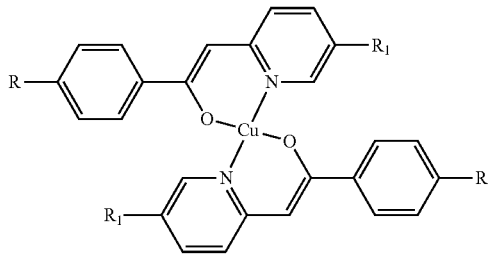

(21)

where R and $R_1$ may be the same or different, and each of R and $R_1$ may be H, $-OC_8H_{17}$, or $-OC_6H_{13}$.

These complexes are synthesized by preparing a solution of 0.2 mmol of free phenacyl pyridine ligand in 4 ml of mixture of acetone/DMF and refluxing for 0.5 hour. 0.4 mmol of solid copper (II) acetate monohydrate is then added and the reaction mixture is refluxed for two hours. Upon cooling, brown crystals appear from the solution. The crystals are separated by filtration and washed with cold acetone.

Where R and $R_1$ are both H, the resultant copper (II) complex is Copper (II) 2 (phenacyl pyridine). Where R is $-OC_8H_{17}$ and $R_1$ is H, the resultant complex is Copper (II) 2-phenacyl-5-octyloxypyridine. Where both R and $R_1$ are $-OC_8H_{17}$, the resultant complex is Copper (II) 2-(4-octyloxyphenacyl)-5-octyloxypyridine. Where both R and $R_1$ are $-OC_6H_{13}$, the resultant complex is Copper (II) 2-(4-hexyloxyphenacyl)-5-hexyloxypyridine.

Mixtures of these copper complexes of phenacyl pyridines may be prepared for use in the polymer dispersed liquid crystal composites of the present invention. The mixtures may comprise up to 100% of the liquid crystal discontinuous phase of the polymer dispersed liquid crystal composite, such mixtures containing no non-metallic organo liquid crystal. Mixtures of these copper complexes may also be prepared which include non-copper complexed ligands. The presence of the non-complexed ligands in such mixtures increases markedly the solubility of the copper complexes. The copper complex/ligand mixtures may comprise up to 100% of the discontinuous liquid crystal phase of the polymer composites of the present invention. Eutectic mixtures of these complexes may be prepared (see Example 21).

Another class of MOMs suitable for use in the polymer dispersed liquid crystal composite of the present invention are these of Cholesteric (chiral nematics) where the aliphatic group(s) of the chemical structures contain one or more asymmetric carbons. The existence of a chiral group in the nematic forming compounds can result in a helicoidal structure in the mesophase. This helicoidal long range effect is identified with a twist or "pitch" factor, which can be measured optically or spectroscopically. If the "pitch" of the cholesteric structure falls within the visible range of the wavelength of light, it reflects the color associated with the "pitch" length, and the phase will be colored. The "pitch" is affected by a number of factors; mostly the "concentration" and the temperature. Addition of cither cholesteric (chiral nematic) MOMs, their ligands or other non-mesogenic solutes with chiral group to a nematic liquid crystal compound or mixture (including nematic MOMs) may create a "cholesteric" phase with a reflective color associated with the "pitch" of the cholesteric mixtures.

The use of "cholesteric" MOMs can provide the possibility of color matching in the mixtures of MOMs or with liquid crystals, where the "absorption" colors due to the metal-complex can be combined and/or matched with that of the "reflection" colors due to cholesteric pitch for a vast range of application in liquid crystal display technology. Descriptions of such cholesteric/chiral nematic MOMs may be found in M. Ghedini et al., Liq. Cryst., Vol. 15, 33 1 (1993); and M. Ghedini et al., Chem. Mater. 5, 883 (1993). Such cholesteric/chiral nematic compounds may be compounds of the following formulae:

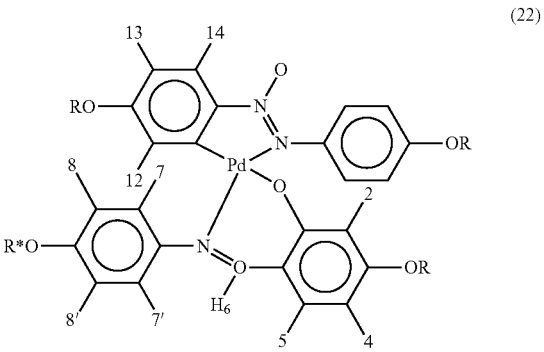

(22)

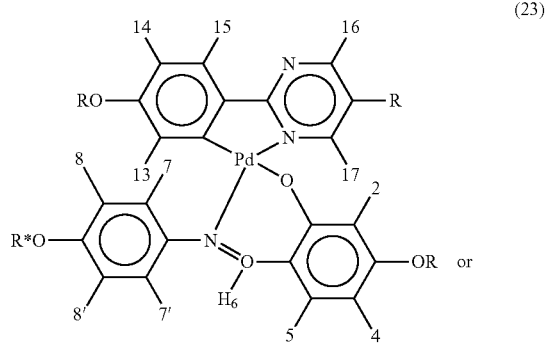

(23)

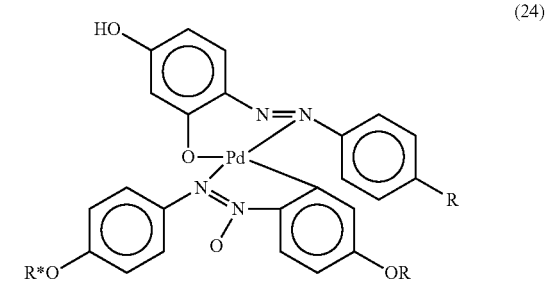

(24)

where R is $CH_3(CH_2)_m-$, where m=1-20, and where R* is

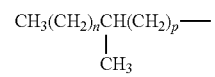

where n and p=1-10.

A description of the synthesis of the palladium complexes of the general formula 24 may be found in Italian patent application VE92A000003.

Other metal-organic liquid crystal compounds suitable for use in the present invention include compounds of the formulae:

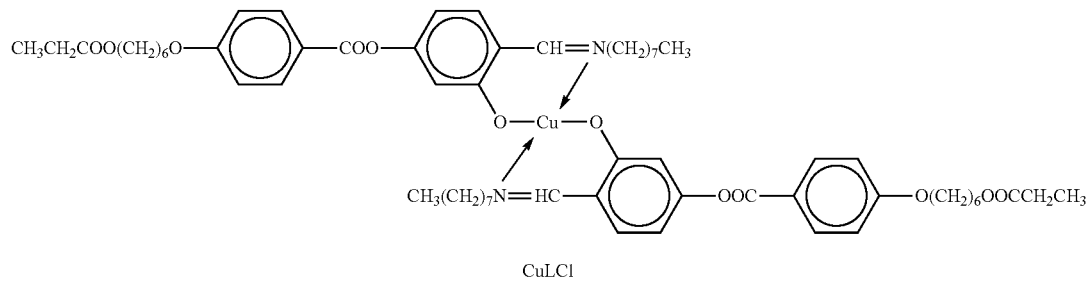

(25)

CuLCl

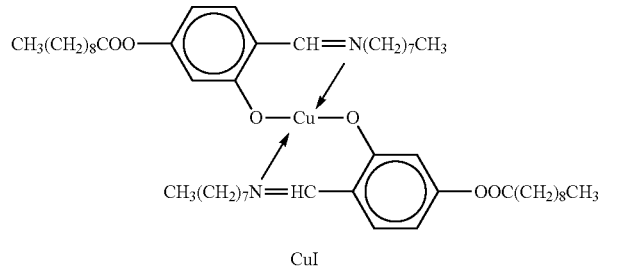

(26)

CuI

The synthesis of Cu-1 is described in Caruso et al., Macromolecules 24, p. 2606 (1991). CuLCl may be synthesized as follows. 3.92 g of the following compound,

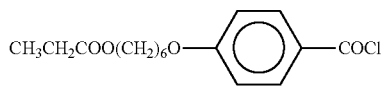

the synthesis of which is described in Caruso et al., Macromolecules 24, p. 2606 (1991), are dissolved in 80 mL dehydrated chloroform and reacted with 3.33 g of the following compound, also described in the above reference:

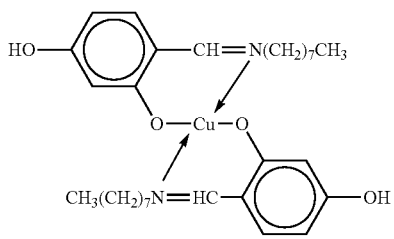

together with 1.92 g of tetrabutylammonium hydrogen sulphate and 1.24 g KOH dissolved in 150 mL water. The reaction is performed in a blender for 10 min. The chloroformic phase is then treated several times with water, dried and evaporated to 30 mL volume. Crystallization of CuLCl is obtained after addition of 150 mL ethanol. Yield: 4.49 g (90%).

Another metal-organic mesogen suitable for use in the polymer dispersed liquid crystal composites of the present invention includes compounds having the formula:

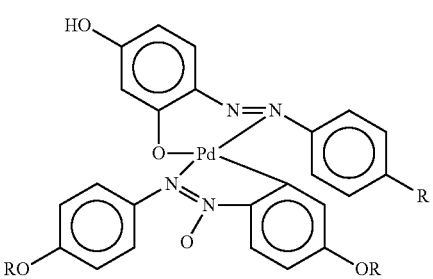

(27)

where R is $CH_3(CH_2)_m-$, where m=1-20. These compounds are described in Italian patent application VE92A00003.

The invention also contemplates the use of polymeric forms of the aforementioned types of MOMs, such as characterized by Giroud-Godquin and Maitlis, supra, at page 396 (section 7.3).

As should be apparent to those working in this art, the difference in physical properties of the MOMs as compared to the non-metal containing liquid crystal traditionally used in polymer dispersed liquid crystal composites, provides a mechanism of control over the kinetics of phase separation and resin curing to vary and particularly to improve the contrast ratio (transparency/opacity) of polymer dispersed liquid crystal films by controlling (i) the solubility of liquid crystal in the resin, (ii) the rate of droplet formation, (iii) controlling the rate of polymer solidification, and (iv) controlling the liquid crystal droplet morphology (size, density). This is especially the case where MOMs are used in conjunction with conventional, non-metallic liquid crystals in the polymer dispersed liquid crystal composite.

In a preferred non-limiting embodiment of the invention, the organometallic liquid crystal is used in combination with another compatible liquid crystal composition that is non-metallic. Preferably, these other liquid crystals are of the nematic form or operationally nematic which means that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. More preferably, they also have a positive dielectric anisotropy.

In another preferred non-limiting embodiment of the invention, the organometallic liquid crystal comprises 100% of the liquid crystal discontinuous phase. In these embodiments, mixtures of compatible organometallic liquid crystals are employed. Such mixtures may be eutectic mixtures of organometallic liquid crystals. In still other embodiments, mixtures (including eutectic mixtures) of organometallic liquid crystals and their ligands are employed. The inclusion of the ligands of the organometallic liquid crystals in mixtures of the organometallic liquid crystals may improve the solubility of the organometallic liquid crystals.

Where the organometallic liquid crystals are uses in combination with non-organometallic liquid crystals, the organometallic liquid crystals should be compatible with the non-organometallic liquid crystals. Preferably, the organometallic liquid crystals should be soluble in the non-organometallic liquid crystals. The combination of the metallo organic mesogens and the conventional liquid crystals generally form a eutectic melting mixture. This is noted by the increase of the liquid crystal mixture's increase in $T_{ni}$. Suitable nematic liquid crystals in compositions typically contain a linear chain of at least one, preferably at least two, aromatic group preferably phenylene or heterocyclic aromatic groups, connected to a linking group such as a covalent bond, a carbonyloxy group, a vinylene group (—CH═CH—), a carbonylimino group, an ethynylene group (—C═C—), an azomethine group (—CH—N—), an azo group (—N═N—), an azoxy group, and the like. Preferred non-metallic liquid crystals comprise cyanobiphenyls, and may be mixed with cyanoterphenyls and with various esters.

Typical organic classes of liquid crystal forming materials contemplated comprise both aromatic and aliphatic organic compounds such as benzylideneanilines generally prepared from the reaction of para-substituted benzaldehyde and parasubstituted aniline; N-(p-alkoxybenzylidene)-p-aminostyrenes prepared from the reaction of the appropriate aldehyde with p-aminostyrene; derivatives of beta sitosterol; active amyl ester of cyano benzylidene amino-cinnamate; p-phenylene containing compounds such as p-phenylene p-alkoxybenzoates; aminoacetophenones; aminopropiophenones; phenylenediamines; chlorophenylenediamines; terephthals; p,p'-disubstituted bibenzyls; p,p'-disubstituted stilbenes; p,p'-disubstituted diphenylacetylenes; p,p'-disubstituted-1,4-diphenylbutadienes; p,p'-diisubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

Specific liquid-crystal compounds include ethyl p-4-ethoxy-benzylideneaminocinnamate; p,p'-azoxybenzoic acid diethyl ester; N-(p-methoxybenzylidene)-p-aminostyrene; N-(p-butoxybenzylidene)-p-aminostyrene; p-azoxyanisole; p-hexyloxybenzalazine; p-azoxy-phenetole; p-anisylidene-p-biphenylamine; p-ethoxy-benzylidene-p-biphenylamine; p-anisylidene-p-aminophenyl acetate; p-ethoxybenzylidene-p-aminophenyl acetate; p-n-hexyloxy-benzylidene-p-aminophenyl acetate; p-n-hexoloxybenzylidene-p-aminophenyl acetate; deca-2,4-dienoic acid; 4,4' di-n-heptoxyazoxybenzene; 4,4' di-n-hexoxyazoxybenzene; 4,4' di-n-hexoxyazoxybenzene; 4,4' di-n-pentoxyazoxybenzene; 4,4' di-n-butoxyazoxybenzene; 4,4'diethoxy-azoxybenzene; undeca-2,4-dienoic acid; nona-2,4-dienoic acid; 4,4' dimethoxystilbene; 2,5-di(p-ethoxybenzylidene) cyclopentanone; 2,7-di-(benzylidencamino) fluorene; 2-p-methoxybenzylideneaminophenanthrene; 4-methoxy-4"-nitro-p-terphenyl; 4-p-methoxybenzylideneaminobiphenyl; 4,4'-di(benzylideneamino)biphenyl; p-n-hexylbenzoic acid; p-n-propoxybenzoic acid; trans-p-methoxycinamic acid; 6-methoxy-2-naphtholic acid; p-phenylene di-p-anisate; p-phenylene di-p-ethoxybenzoate; p-phenylene di-p-n-hexyloxybenzoate; p-phenylene di-p-n-heptyloxybenzoate; p-phenylene di-p-n-octyloxybenzoate; 1,4-bicyclo[2.2.2.] octylenedi-p-anisate; 1,4-bicyclo[2.2.2] octylene di-p-n-octyloxybenzoate; trans-1,4-cyclohexylene di-p-n-butoxybenzoate; 4,4'-di(p-methoxybenzylideneamino)dibenzyl; p,p'-diacetoxystilbene; 1,2-di(p-methoxyphenyl)-acetylene; p-(p-acetoxyazo) benzoic acid; 1,4-di-(p-methoxyphenyl)-butadiene; p-anisal-p-anisidine; p,p'dimethoxydibenzal-1,4-naphthalenediamine; p-n-butylbenzoic acid; p,p'-di-n-butyl-diphenylpyridazine; p-(p-cyanobenzal) anisdine; p-(p-methoxybenzoxybenzoic acid, anisal-p-aminozobenzene; 1-(4'-anisalamino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N-dibenzylidenebenzidine; N,N'-di(p-n-hexyloxybenzylidene)benzidine; p-bis (heptyloxybenzoyloxy)benzene; p-n-propoxybenzoic acid; p-n-butoxybenzoic acid; p-n-hexyloxybenzoic acid; p-n-heptyloxybenzoic acid; p-n-amyloxybenzoic acid; p-n-octyloxybenzoic acid; butyl-p-(p-ethoxyphenoxycarbonyl) phenylcarbonate; p-(p-ethoxyphenylazo)phenylheptanoate; 4-[(p-hexyloxycarbonyloxybenzylidene)amino]-1-pentyloxybenzene; N-p-(pentyloxycarbonyloxy)benzylidene]-p-anisidine; p-[(p-butoxyphenyl)azo] phenyl butyl carbonate; p-(p-ethoxyphenylazo)phenyl hexanoate; p-(p-ethoxy-phenylazo)phenyl valerate; p-[(p-ethoxybenzylidene)amino] benzonitrile; p-[(p-methoxybenzylidene)amono] benzonitrile; p-[(p-ethoxybenzylidene)amino]phenylbenzoate; ethyl p-[(p-methoxybenzylidene)amino]cinnamate; p-(p-ethoxyphenylazo)-phenyl crotonate; p-[(p-methoxybenzylidene) amino]-phenyl p-toluate; 4-decyloxybenzylidene-4'-amino-acetophenone; p-[(p-methoxybenzylidene)amino] phenylbenzoate; N,N'-di(p-methoxybenzylidene)α,α'-biptoluidine; p-anisalazine; 4-acetoxy-3-methoxycinnamic acid; p-acetoxycinnamic acid; 4'-[(p-pentyloxycarbonyloxybenzylidene)aminovalerophenone; diethyl-p,p'-azoxydicinnamate; 4-butoxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4'-aminoacetophenone; 4-methoxybenzylidene-4'-aminoacetophenone; 4-nonyloxybenzylidene-4'-aminoacetophenone; 4-octyloxybenzlidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4-heptyloxybenxylidene-4'-aminopropiophenone; 4-nonyloxybenzylidene-4'-aminopropiophenone; 4-hexyloxybenzylidene-4'-aminopropiophenone; 4-methoxybenzylidene-4'-aminopropiophenone; 4-octyloxybenzylidene-4'-aminopropiophenone; 4-pentyloxybenzylidene-4'-aminopropiophenone; 4-propoxybenzylidene-4'-aminopropiophenone; bis-(4-bromobenzylidene)-2-chloro- 1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-n-dodecyloxybenzylidene)-2-chloro-1,4-phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxybenzylidene)-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine, bis-(4-n-decyloxybenzylidene)-1,4-phenylenediamine; bis-(4-n-dodecyloxybenzylidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxybenzylidene)-1,4-phenylenediamine; bis-(4-n-pentyloxybenzylidene)-1,4-phenylenediamine; terephthal-bis-(p-bromoaniline); terephthal-bis-(p-chloroaniline); terephthal-bis-(p-fluoroaniline); terephthal-bis-(p-iodoaniline), and the like.

Nematic liquid crystalline materials suitable for use with the organometallic liquid crystals include: p-azoxyanisole, p-azoxyphenetole, p-butoxybenzoic acid, p-methoxy-cinnamic acid, butyl-p-anisylidene-p-aminocinnamate, anisylidene p-amino-phenylacetate, p-ethoxy-benzalamino-α-methyl-cinnamic acid, 1,4-bis (p-ethoxybenzylidene) cyclohexanone, 4,4'-dihexyloxybenzene, 4,4'-diheptyloxybenzene, anisal-p-aminoazo-benzene, anisaldazine, α-benzene-azo-(anisal-α'-naphthylamine), n,n'-nonoxybenzetoluidine; anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylideneproprionate-p'-aminophenylmethoxide, p-n-anixylidene-p'-aminophenylbuterate, p-n-butoxybenzylidene-p'-aminophenylpeatoate and mixtures thereof. Conjugated cyano-organic compounds that are useful are 7, 7', 8, 8'-tetracyanoquinodimethane (TCNQ), (2,4, 7,-trinitro-9-fluorenylidene)-malono-nitrile (TFM), p-[N-(p'-methoxybenzylidene) amino]-n-butylbenzene (MBBA), p-[N-(p'-ethoxybenzylidene) amino]-butylbenzene (EBBA), p-[N-(p'-methoxybenzylidene) amino]phenylbutyrate-n-butyl-p-(p'-4-nonyloxybenzylidene-4'-aminopropiophenone; ethoxyphenoxycarbonyl) phenylcarbonate, p-methoxy-p'-n-butylazoxybenzene, p-ethoxy-p'-n-butylazobenzene, p-[N-(p'-methoxybenzylidene) amino]benzonitrile (BBCA), p-[N-(p'-hexylbenzylidene) amino]benzonitrile (HBCA), pentylphenyknethoxy benzoate, pentylphenylpentyloxy benzoate, cyanophenylpentyl benzoate, cyanophenylpentyl benzoate, cyanophenylpentyloxy benzoate, cyanophenylheptyloxy benzoate, cyanophenyloctyloxy benzoate, cyanophenylinethoxy benzoate, and the like.

Desirable nematic liquid crystals frequently comprise cyanobiphenyls, and may be mixed with cyanoterphenyls and with various esters. There are commercially available nematic type liquid crystal mixtures, such as liquid crystal mixture "E7" (Licrilite® BL001 from E. Merck, Darmstadt, Germany, or its subsidiaries such as EM Industries, Hawthorne, N.Y. and Merck Industrial Chemical, Poole, England) that is a mixture of (by weight), 51% 4'-n-pentyl-n-cyanobiphenyl (5CB), 21% 4'-n-heptyl-n-cyanobiphenyl (7CB), 16% 4'-n-octoxy-4-cyanobiphenyl, 12% and 4'-n-pentyl-4-cyanoterphenyl that has a crystal to nematic liquid crystal phase transition temperature of −10° C. and a liquid crystal to isotropic phase transition temperature of 60.5° C. Illustrative of other such commercial liquid crystal mixtures are the following:

E-31 is a proprietary mixture of cyanobiphenyls and a non-cyano biphenyl ester available from E. Merck, supra, and having a crystal to nematic crystal phase transition temperature of −9° C. and a liquid crystal to isotropic phase transition temperature of 61.5° C. E-44 is a proprietary mixture of cyanobiphenyls, a cyanoterphenyl and a non-cyano biphenyl ester available from E. Merck, supra, and having a crystal to nematic liquid crystal phase transition temperature of −60° C. and a liquid crystal to isotropic phase transition temperature of 100° C. E63, from E. Merck, supra, is a liquid crystal mixture that is similar to the E7 with added cyclohexanes. It contains: significant amounts of the commonly known liquid crystal component 5CB, 7CB, lesser amounts of 5CT, lesser amounts of Benzonitrile, 4-(4 propyl-1-cyclohexen-1-yl), commonly known as PCH3, lesser amounts of 4-carbonitrile, 4'(4-pentyl-1-cyclohexen-1-yl)-1,1'-biphenyl, commonly known as BCH5, and still lesser amounts of [1,1'-Biphenyl]-4-carboxylie acid, 4'-heptyl-4'-cyano [1,1'-biphenyl]-4-yl ester, commonly known as DB71. K-12 is 4-cyano-4'-butylbiphenyl and has a crystal to nematic liquid crystal phase transition temperature of 48° C. K-18 is 4-cyano-4'-hexylbiphenyl and has a crystal to nematic liquid crystal phase transition temperature of 14.5° C. and a liquid crystal to isotropic phase transition temperature of 29° C. K-21 is 4-cyano-4'-heptylbiphenyl and has a crystal to nematic liquid crystal phase transition temperature of 30° C. K-24 is 4-cyano-4'-octylbiphenyl and has a crystal to smectic A liquid crystal phase transition temperature of 21.5° C., a smectic C to nematic liquid crystal phase transition temperature of 33.5° C. and a nematic liquid crystal to isotropic phase transition temperature of 40.5° C. M-15 is 4-cyano-4'-pentoxybiphenyl and has a crystal to nematic liquid crystal phase transition temperature of 48° C. and a liquid crystal to isotropic phase transition temperature of 68° C. M-18 is 4-cyano-4'-hexoxybiphenyl and has a crystal to nematic liquid crystal phase transition temperature of 57° C. and a liquid crystal to isotropic phase transition temperature of 75.5° C. M-24 is 4-cyano-4'-octoxybiphenyl and has a crystal to smectic A liquid crystal phase transition temperature of 54.5° C., a smectic A to nematic liquid crystal phase transition temperature of 67.0° C. and a nematic to isotropic phase transition temperature of 80.0° C. Other desirable Licrilite® liquid crystal mixtures include BL003, BL004, BL009, BL011, BL012, BL032, BL036, BL037, BL045, BL046, ML-1001, ML-1002, as well as TL202, TL203, TL204 and TL205, all obtainable from E. Merck, supra.

TOTN404, available from Hoffman-LaRoche, Basel, Switzerland and Nutley, N.J., is a liquid crystal mixture similar to E7 but with added pyrimidines. It contains approximately 30 weight percent of 4-carbonitrile,4'-pentyloxy-1,1-biphenyl commonly known as 5OCB, 15 weight percent of 4-carbonitrile,4'-octyloxy-1, 1-Biphenyl, commonly known as 8OCB, 10 weight percent of 4-carbonitrile-4"-pentyl-1, 1', 4', 1"-terphenyl, commonly known as 5CT, 10 weight percent of 4-(5-pentyl-2-pyrimidimyl)-benzonitrile, commonly known as RO-CP-7035, 20 weight percent of 4-(5-heptyl-2-pyrimidimyl)-benzonitrile, commonly known as RO-CP-7037, and 15 weight percent of 4-[5-(4-butylphenyl)-2-pyrimidinyl] benzonitrile, commonly known as RO-CM-7334.

ROTN-570, available from Hoffman-LaRoche is a cyanobiphenyl liquid crystal mixture comprises 51 weight percent of 4-cyano-4'-pentyiuiphenyl, 25 weight percent of 4-cyano-4'-heptylbiphenyl, 16 weight percent of 4-cyano-4'-octyloxybiphenyl, and 8 weight percent of 4-cyano-4'-pentyl-p-terphenyl. Another desirable liquid crystal mixture from Hoffman-LaRoche is TNO623.

The invention encompasses non-homogeneous mixtures of the metallo organic mesogen and the conventional liquid crystals (the non-organometallic liquid crystals). This is accomplished by keeping the different liquid crystals in separate phases. Such phase distinction can be effected by encapsulating either or both of the types of liquid crystals (organometallic liquid crystals vs. non-organometallic liquid crystals) in a polymeric medium. A convenient way of doing this is to encapsulate the liquid crystals, one type or the other, or both types, by NCAP techniques, such as those described above. The NCAP'd liquid crystals can be mixed with the non-encapsulated liquid crystals and the combination, or the NCAP'd mixture alone, can be conventionally polymer dispersed.

Some examples of the metallo-organic mesogen dye formulas are:

Each mixture consisted of a three-component system corresponding to the following general chemical structure:

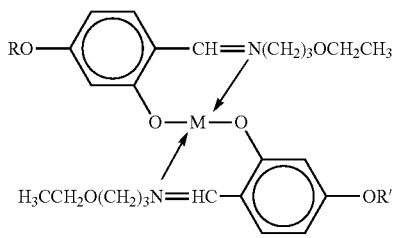

Two iso-functional were linked (both aldehydes) molecules to react simultaneously with the amine and, eventually, with the metal ion. Although only two iso-functional species were utilized (aldehydes and/or amines), a simultaneous synthesis of more than two iso-functional species could provide an increasing number of structurally different metal complexes. Six three-component metallomesogen mixtures were prepared at various combinations of metals and ligands. Each component of the mixture designated with the short formula: L-MII-L, consisted of either MII=Ni2+ and VO2+ complexed to different combinations of ligands with aliphatic (L), chiral (L*) or acrylic (L') chains shown in the following structures:

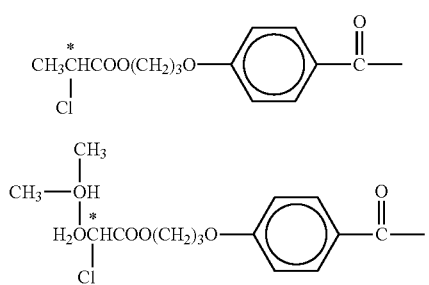

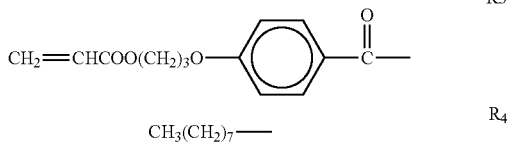

Some typical non-limiting MOM formulations suitable for use with the invention disclosed herein are given in Table 1.

TABLE 1

| MOM | Component-1 | | Component-2 | | Component-3 | | Metal | Color |
|---|---|---|---|---|---|---|---|---|
| | R | R' | R | R' | R | R' | | |
| Gauzy-1 | R4 | R3 | R4 | R4 | R3 | R3 | $Ni^{2+}$ | Pale Green |
| Gauzy-2 | R4 | R3 | R4 | R4 | R3 | R3 | $VO^{2+}$ | Pink |

Formula of the Metallomesogen Chemical Mixtures:
Gauzy-1 & Gauzy-2:
25% R+25% R': —$(CH_2)$—$CH_3$;
25% R+25% R': —$C_6H_5$—O—$(CH_2)_6$—OOC—CH═$CH_2$;
50% R: —$(CH_2)_7$—$CH_3$; R': —$C_6H_5$—O—$(CH_2)_6$—OOC═CH—$CH_2$.

In a preferred embodiment of the present invention the metal-organic mesogens have been modified by the addition of chromophore groups, thus providing a dichroic dye composition comprising metallomesogen (MOM) molecules. This composition is added to liquid crystal devices, thereby providing a film with the following properties: switchable UV and IR transmittance and absorption. The chromophore groups absorb certain wavelengths of and transmit or reflect others. The chromophore groups have two molecular orbitals differing from each other by photon energy within the range of the UV-visible-near IR spectrum.

Ionic Metal-Organic Mesogens

In preferred embodiments of the invention, an ionic mesogen or mixture of ionic mesogens is incorporated into the LC/polymer layer of the device as an ionic dopant. In preferred embodiments of the invention, the concentration of ionic mesogen is 1-10% (w/w relative to the weight of the LC+polymer in the layer). In preferred embodiments of the invention, the ionic mesogen or mixture comprises ionic MOMs. Any ionic mesogen, particularly ionic metal-organic mesogen that is suitable for use as an ionic dopant in an LC device may be used. The inventors have found that while metal-organic mesogens tend to be only sparingly soluble in the polymer/LC device such as a PDLC, PNLC, or PSLC, eutectic mixtures of MOMs tend to be much more soluble. Thus, in some preferred embodiments of the invention, the ionic mesogens used as the ionic dopant comprise a eutectic mixture of MOMs.

Ionic MOMs, characterized by the general formula $L_2Ag^+$, have been discussed above. These types of MOMs are well known in the literature; see, for example, Bruce, D. W. *Acc. Chem. Res.* 2000, 33, 831.

In order to assist a person of ordinary skill in the art to make and use the invention, the following additional examples of ionic MOMs suitable for use as ionic dopants in the instant invention are provided. These examples are not intended to be limiting in any way.

In a 1996 review article, Neve (Neve, F. *Adv. Mater.* 1996, 8, 277) discusses several families of ionic MOMs, including the $L_2Ag^+$ MOMs discussed above. Examples include complexes of transition metal cations such as $Cu^+$, $Ag^+$, and $Pd^{2+}$ complexed to macrocyclic ligands such as $N_2S_4$ macrocycles and thioether crowns. Typical structures include the following:

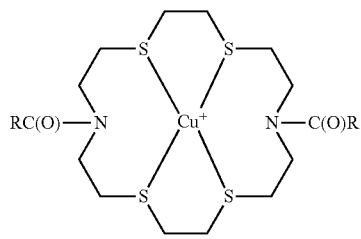

where

n=6, 10, 11, or 12.

Neve also discloses ionic MOMs in which a transition metal is complexed to pyridynyl-type ligands, such as is found in the following complex:

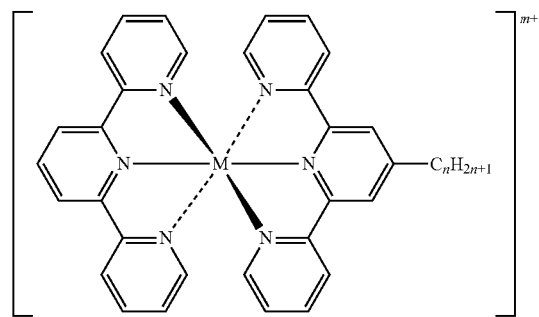

where M=Rh (m=3, n=19) or Ru (m=2, n=19 or 31).

Neve further discloses a series of anionic MOMs that contain a vanadyl moiety. These MOMs have the following structure:

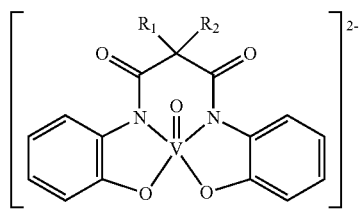

MOMs in this family include complexes of the form $R_1=R_2=C_{18}H_{37}$; $R_1=R_2=C_{10}H_{21}$; $R_1=CH_3$, $R_2=C_{12}H_{25}$; and $R_1=CH_3$, $R_2=C_{16}H_{33}$.

Ghedini and Pucci (Ghedini, M.; Pucci, D. *J. Organomet. Chem.* 1990, 395, 112) reported the following ionic MOM:

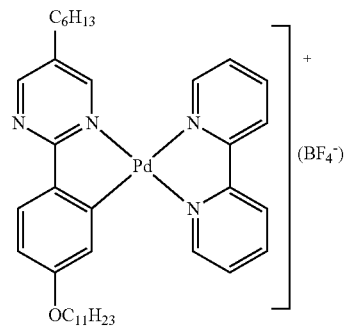

Pucci et al. later disclosed similar ionic MOMs (Pucci, D.; Barberio, G.; Bellusci, A.; Crispini, A.; Ghedini, M., J. Organomet. Chem. 2006, 691, 1138) of the following structures:

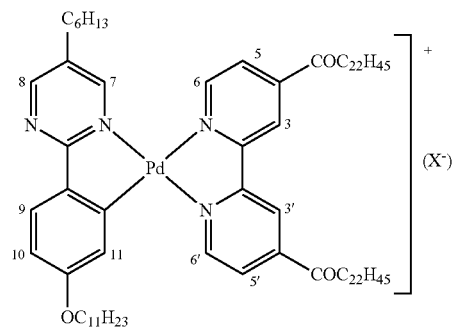

[Pd(L)4,4'-R$^1$-bpy)][BF$_4$]  1
[Pd(L)4,4'-R$^1$-bpy)][ClO$_4$]  2

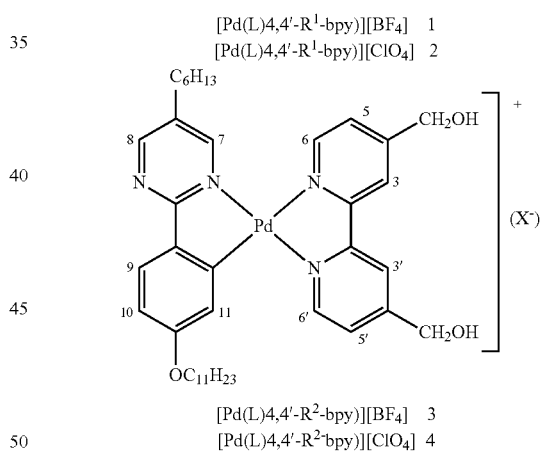

[Pd(L)4,4'-R$^2$-bpy)][BF$_4$]  3
[Pd(L)4,4'-R$^2$-bpy)][ClO$_4$]  4

Additional examples of ionic MOMs can be found inter alia in a 2011 review of thermotropic ionic liquid crystals (Axenov, K. V.; Laschat, S. Materials 2011, 4, 206).

Bistable Nematic Film Device

In one embodiment of the invention, a bistable switchable nematic liquid crystal device, such as may be used in a window type of application, is disclosed that can be switched between a transparent state and a light scattered state by a voltage pulse and/or frequency. No further amount of voltage to the device is required in order to maintain either the transparent state or the light scattering state. Therefore, the device is energy-saving and efficient and effective in use.

The device includes structures that are electrically switched between an opaque state and a transparent state.

Typically, in the opaque state, the liquid crystal molecules scatter light because nematic molecules are randomly oriented and is known as random micro-domain state. Furthermore, in the transparent state, the liquid crystal molecules are aligned perpendicular to the substrate. No reflecting or scattering of light in the visible spectrum occurs. This is known as homeotropic state or texture. A prior art liquid crystal device is shown in FIG. 1. Here, the liquid crystal molecules are switched from the random micro-domains texture to homeotropic texture by applying an electric field to the liquid crystal molecules. The homeotropic structure could be stable or metastable and could return to random opaque state when the electric field is removed. By applying an electric pulse or/and frequency to the liquid crystal molecules in the homeotropic texture, the liquid crystal molecules are switched back to the random micro-domains texture.

Figure 2:
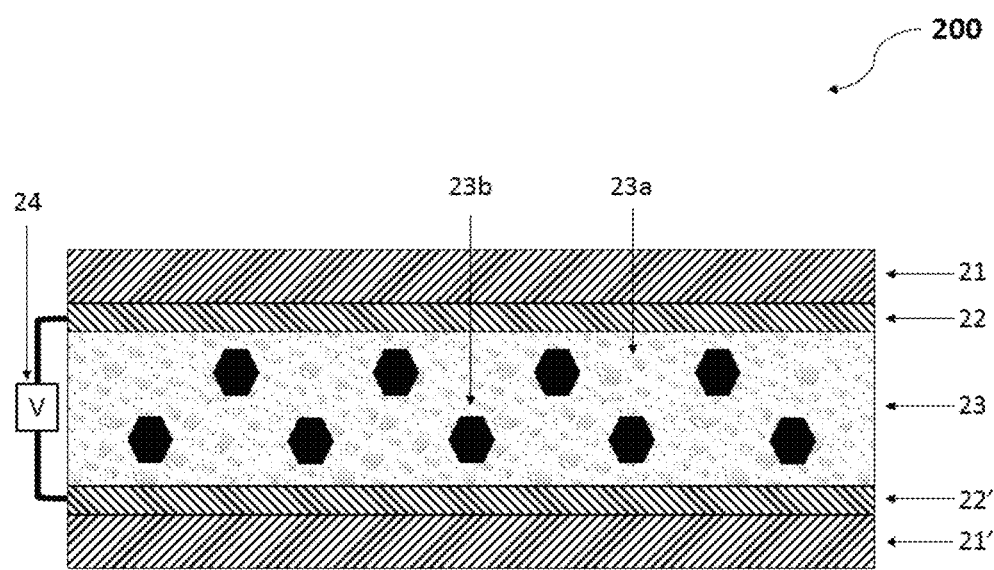
FIG. 2 presents a schematic representation of one embodiment of the present invention; and, FIG. 3 presents schematic representations of the transparent state and the opaque state of one embodiment of the present invention.

Referring to FIG. 2, the illustrative first embodiment of the electro-optical structure of the invention will be described. The electro-optical structure 200 generally comprises a liquid crystal dispersion material 23 interposed between a pair of optically-transparent electrically-conductive layers 22 and 22' supported upon a pair of spaced-apart transparent substrates 21 and 21', each substrate having an interior and exterior surface, respectively, the perimeter edges of which are sealed, and across which a voltage 24 is applied under the control of a microcontroller (not shown). As used herein the term "transparent" means that the film does not absorb a significant amount visible radiation and does not reflect a significant amount of visible radiation, rather, it is transparent to visible radiation. The liquid crystal material 23, further comprises the liquid crystal dispersions 23a and the ionic mesogens 23b. In preferred embodiments of the invention, the ionic mesogens are ionic MOMs; in especially preferred embodiments of the invention, the ionic mesogens comprise a eutectic mixture. The ionic mesogens act as ionic dopants, and in cases in which the MOMs comprise chromophoric groups, they can act as dyes as well. The transparent electrically conductive layers 22 and 22' may comprise indium tin oxide (ITO), silver, zinc oxide or other optically transparent conductive polymer or like film coating. Chemical vacuum deposition, evaporation, sputtering, or other suitable coating techniques may be used for applying the conductive layers 22 and 22' to the transparent substrates 21 and 21'. In some examples, providing a conductive layer on at least one of the substrates may be sufficient.

Examples of transparent substrates 21 and 21' include polymer films. The polymer films include films made of polyolefin, polyester, polyvinyl chloride, polyvinyl fluoride, polyvinylidene difluoride, polyvinylidene chloride, polyacrylate, polycarbonate, polyurethane, etc., and combinations thereof. In one embodiment, the flexible films comprise PET films. The transparent substrates 21 and 21' may also include glass panels and rigid polymeric films, such as polycarbonate, plexiglass, etc.

Electrical leads are attached to the conductive layers 22 and 22'. A voltage source 24 is shown connected to the conductive layers in order to switch the liquid crystal dispersion layer between different optical states by application of an electric field pulse and/or frequency. The voltage source may be an AC voltage source or a DC-AC inverter and a battery. In addition, the switching power may be supplied by a photovoltaic device that converts solar power to electrical power.

In an example, the liquid crystal material 23 comprises nematic liquid crystals. The liquid crystal material may also include a polymer matrix formed from at least one polymerizable monomer and a photo-initiator. The polymer matrix stabilizes or supports the nematic liquid crystals. Due to strong anchoring of nematic molecules, the polymer matrix facilitates to maintain the stability of both light transmitting and light scattering states without a field applied after switching between the states. The characteristics relate to forming polymer networks where micro-domains of liquid crystal material are dispersed between the networks or into micro-droplet domains. The micro-domains liquid crystals tend to be aligned with the polymer networks through strong surface molecular anchoring, extending between the substrates 21 and 21' as shown. This favors the transparent homeotropic state due to the aligning and confining effect of the polymer network, facilitating maintaining this condition until being switched to the light scattering state. Upon switching to the light scattering state, the nematic liquid crystal intermolecular interactions with polymer matrix is released by the applied electric pulse and/or frequency, which favors maintaining the light scattering poly-domain state, without applied voltage. In this way, the bistability of the system is achieved.

In another embodiment, the liquid crystal material 23 comprises a polymer matrix having nematic liquid crystals stabilized or supported therein. The polymer matrix is generally formed by polymerization or crosslinking of at least one polymerizable monomer or crosslinkable polymer with non-reactive nematic liquid crystals, and a chiral additive. Polymerization of the liquid crystal mixture is initialized in any suitable manner, as by UV radiation, heating, cooling or solvent evaporation, depending upon the polymer used.

Bistable Smectic Film Device

The smectic-A liquid crystal phase is a material with molecular layered structure, in which the rod-shaped molecules are aligned normal to the layer planes, having a well-defined interlayer distance. Generally, all smectics are more ordered and viscous than nematic LCs and, in some thermotropic LCs, the smectic phases occur below the nematic phase in the phase diagram. The well-known structural defects in smectic-A are called "focal conic" domains (FCDs). These defects are energetically very stable defects. Therefore, once FCDs and aligned state are formed they can preserve their static defect structures indefinitely until thermal energy or electromagnetic fields are applied. This state of smectic-A is also known as the light scattering or the opaque state. The other optically stable state of the Sm-A is the transparent state, in which the unperturbed smectic layers are uniformly parallel to the substrate surfaces. However, the nucleation of FCDs from the transparent state is highly hindered by the high-energy barrier. Even though surface alignment layers or bulk irregularities were used to nucleate FCD defects, the reversible bi-stability was not reported in these studies. Over the years, only two methods were reported as a viable solution for obtaining reversible bi-stability in smectic-A LCDs. These displays are thermally and laser addressed Sm-A LCDs and electrically addressed (ionically-doped) Sm-A LCs.

In comparison to bistable nematics, a bistable Sm-A structures require greater energy input to create changes in the molecular order. On the other hand, high transparency in homeotropic state and higher scattering density in the focal-conic texture in opaque state, are far better than a cholesteric phase. Thus, higher-resolution bistable devices have been designed by using the Sm-A phase of LCs. The inherent bistability in smectic-A displays can potentially provide excellent viewing angle characteristics, sunlight readability, and low power consumption at both of the stable states. As a result, reversible and controlled switching between two optically stable states of smectic-A liquid crystals have been explored in several ways to realize a Sm-A based bistable LC devices.

In one embodiment of the invention the bistable liquid crystal film is composed by smectic liquid crystal that preserves their orientation after an electrical impulse has been applied.

Based upon the foregoing disclosure, it should now be apparent that the bistable switchable liquid crystal window as described herein will carry out the objects set forth hereinabove. It is, therefore, to be understood that any variations evident fall within the scope of the claimed invention and thus, the selection of specific component elements can be determined without departing from the spirit of the invention herein disclosed and described.

This invention can be used in a wide variety of applications including, but not limited to: advertising, store windows, blinds, decorative glass, and architectural and automotive display, privacy and solar windows.

Process for manufacture of the bistable liquid crystal device

In a preferred embodiment, the process for manufacture of the bistable switchable liquid crystal device disclosed herein comprises as its first step providing two transparent substrates each of which is coated with a transparent conductive layer. In preferred embodiments of the invention, the transparent substrates are separated by spacers that create a volume therebetween. A dispersion comprising at least one liquid crystal, a polymerizable monomer, and an ionic dopant that comprises at least one ionic mesogen is then deposited into the volume between the substrates. In preferred embodiments, the ionic mesogen is an ionic MOM or eutectic mixture of MOMs. The perimeter of the transparent substrates is sealed in order to contain the dispersion. The dispersion is then cured in order to polymerize the monomer.

In some non-limiting embodiments, the polymer matrix is formed by preparing a mixture containing one or more crosslinkable monomers, one or more preferably non-crosslinkable liquid crystals (which may be nematic, smectic, or cholesteric) and one or more ionic mesogen dopants, and then crosslinking the monomers to form a liquid crystal matrix. The ionic mesogens are preferably chiral.

A liquid crystal polymer stabilized cholesteric texture (PSCT) is formed when a small amount of a UV crosslinkable polymer in its liquid crystal phase and a photo-initiator are mixed with a cholesteric liquid crystal and/or a mixture of nematic or smectic liquid crystals with a chiral dopant the pitch of which is tuned to the UV, visible or infrared region.

The crosslinkable monomer concentration is typically greater than about 5.0% by weight of the total liquid crystal mixture. The mixture is then cured by exposure to UV light, electron beam radiation, heating, cooling or solvent evaporation, depending upon the polymer used, while an electric field, a magnetic field or surface alignment is applied to align the liquid crystal molecules in either homeotropic (perpendicular) or homogeneous (planar) alignments, or forming the poly-domain structure of focal conic alignment in the absence of external fields. With the field applied during curing, the liquid crystal molecules are aligned in a planar texture (transparent) after the curing.

Particularly useful polymerizable materials include acrylate and methacrylate monomers. Examples of suitable photo-polymerizable monomers include acrylic acid and methacrylic acid, esters thereof, each of which contains an alkyl group, an aryl group, or a cyclo-alkyl group including three or more carbon atoms, and halides thereof. Such photo-curable monomers are, for example, isobutyl acrylate, stearyl acrylate, lauryl acrylate, isoamyl acrylate, 2-ethylhexyl acrylate, n-butyl methacrylate, n-lauryl methacrylate, tri-decyl methacrylate; n-stearyl methacrylate, n-cyclohexyl methacrylate, benzyl methacrylate, isobornyl methacrylate, 2-phenoxyethyl methacrylate, 2,2,3,4,4,4-hexafluorobutyl methacrylate, 2,2,3,4,4,4-hexachlorobutyl methacrylate, 2,2,3,3-tetrachloropropyl methacrylate, 2,2,3,3-tetrachloropropyl methacrylate, perfluorooctylethyl methacrylate, perfluorooctylethyl acrylate, and perchlorooctylethyl methacrylate. Polyfunctional compounds may also be used. Polyfunctional compounds are, for example, ethylene glycol dimethacrylate, bisphenol-A diacrylate, bisphenol-A dimethacrylate, 1,4-butanediol dimethacrylate, 1,6-hexanediol dimethacrylate, trimethylolpropane triacrylate, and tetramethylolmethane tetraacrylate. Other monomers include mono-functional monomer and bi-functional monomer LCI-KSU (Liquid Crystal Institute, Kent State University, USA). Such monomers and polyfunctional compounds may be used independently or in a combination of two or more.

Useful photo-initiators include benzoin methyl ether, as well as other photo-initiators known to those in art.

In an example, transparent substrates 21 and 21' are coated with ITO and heated to remove moisture. The liquid crystal-monomer-mesogen mixture is then deposited onto at least one of the substrates. The second transparent substrate is contacted with the first substrate so that the liquid crystal-monomer mixture contacts conductive layer 22 and/or 22' on each of transparent substrate 21 and 21'.

The liquid crystal material can be coated onto the conductive film by any known method suitable for coating liquid materials. For example, the liquid crystal-monomer mixture may be applied to the conductive film by in-situ coating-lamination, gravure coating, curtain coating, dip-coating, die-extrusion coating, printing and screen printing.

The matrix 23 is prepared by polymerizing the reactive monomer either in zero electric field or in an electric field effective to align the liquid crystal pitch axis (e.g. the liquid crystal helix pitch axis of cholesteric liquid crystals). In one embodiment, matrix 23 is prepared by mixing a liquid crystal with an amount of a reactive monomer. Next, a thin film of the mixture is placed between a pair of conducting layers, wherein the monomer is then allowed to react while an applied electric field is supplied.

Figure 3:
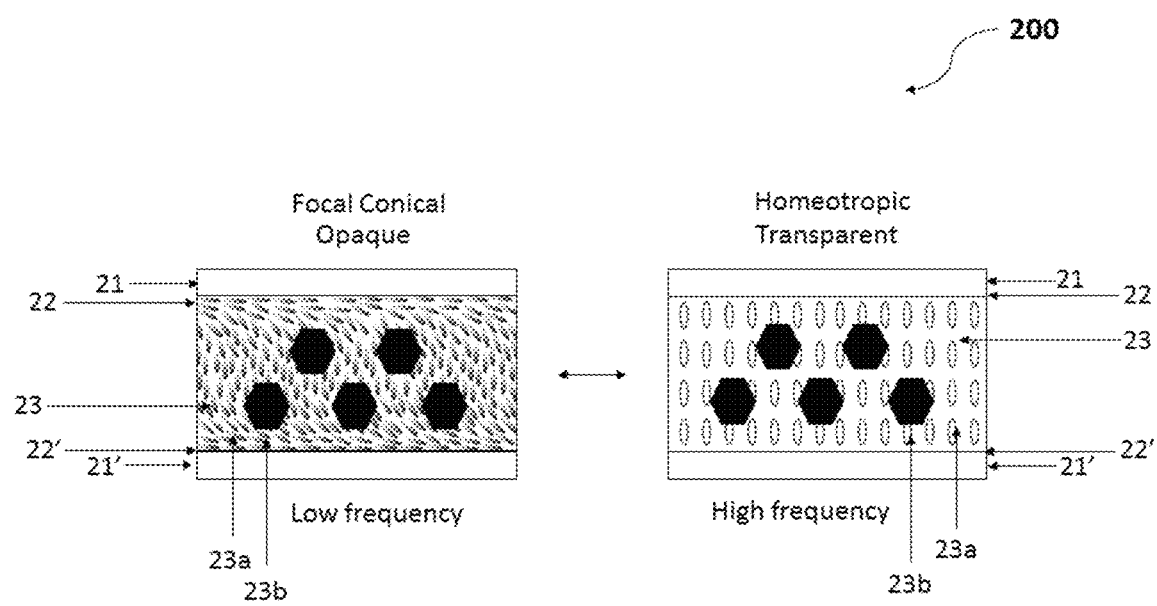

In the case of smectic-A liquid crystals, the transparent state is the perpendicular state where the smectic-A liquid crystal molecules are aligned perpendicular to cell surface direction ("parallel smectic-A layer"), as shown in FIG. 3. The scattering (opaque) state is the focal conic state where the randomly oriented liquid crystal exists in polymer domains, as also shown in FIG. 3. With proper polymer networks, both perpendicular and focal conic states are stabilized at zero field. In the case of smectic-A liquid crystals, the liquid crystal material exhibits a focal conic texture and becomes opaque by an Electro Hydro Dynamic Instability (EHDI) mechanism in the presence of a low frequency (100 Hz) AC electric field pulse. When exposed to a high frequency (1 kHz or higher) pulse of AC electric field, the smectic-A liquid crystal texture tends to align in the direction of the electric field and becomes transparent. Therefore, application or removal of an electric field switches the bistable smectic-A polymer stabilized liquid crystal (PSLC) device disclosed herein from the scattering state to the transparent state or vice-versa via a zero-field mechanism.

In the case of devices that comprise nematic or cholesteric liquid crystals, the transparent state is the planar state where the liquid crystal molecules are aligned parallel to cell surface direction (perpendicular helix pitch axis), as shown in FIG. 3. The scattering (opaque) state is the focal conic state where the liquid crystal exists in randomly oriented polymer domains, as also shown in FIG. 3. With proper polymer networks, both planar and focal conic states are stabilized at zero field. The nematic or cholesteric liquid crystal materials used can also exhibit dual dielectric anisotropies, whereby when a low-frequency (~100 Hz) AC electric field is applied, the molecular dielectric anisotropy is positive and the cholesteric or nematic liquid crystal texture tends to align in the direction of the electric field. In contrast, when exposed to a high frequency AC electric field (10 kHz or higher), the nematic or cholesteric liquid crystal molecules exhibit negative dielectric anisotropy and tend to align perpendicular to the applied field. Therefore, application or removal of the electric field switches the bistable polymer stabilized cholesteric texture (PSCT) from the scattering (opaque) state to the transparent state or vice-versa via a zero-field mechanism.

For example, in PSCT process, the liquid crystal and pre-polymer mixture is then introduced into a 10-30 micron thickness film that includes two parallel flexible films substrates with ITO electrodes. The mixture in the cell is cured under UV irradiation or electron beam to form the bistable switchable liquid crystal film device.

Benefits of Metallomesogen dyes in Bistable LC dispersion devices

The combination of metallomesogens and/or ligand and metallomesogen, as well as their eutectic mixtures in the bistable LC dispersion provide an improvement in the electrooptics of the device. For example, in some compounds the voltage needed to activate the focal conic state ($V_{fc}$) decreases from 18V (of the ligand alone) to 12V (of the compound at 10%), as well as for the nematic state the voltage needed decreases from 33V (of the ligand alone) to 26V (of the compound at 10%). There is also an improvement at the transmission level. In some compounds at 10%, the transmission in focal conic state decreases to 3% and in nematic states increases up to 98.5%.

The solubility of the metallomesogen materials is exhibited either nematic, cholesteric or smectic mesophases. The mixtures show large mesomorphic range and lower transition temperatures than those of the single-components metallomesogens. In most cases, the materials do not crystallize upon super-cooling or quenching and maintained their mesomorphism even below 0° C.

Eutectic mixtures of metallomesogens homologues per se and metallomesogens homologues, also with their parent ligands in the bistable LC dispersion are in the scope of the present invention.

Metallomesogen-chromophore compositions, in particular, eutectic mixtures thereof, are generally highly soluble (>5% w/w) in liquid crystal hosts. These highly soluble eutectic dye mixtures can be used in manufacturing highly stable colored switchable glazing and displays.

The metallomesogen-chromophore compositions can provide a mesogenic phase in wide temperature range which is very important for exploiting switching bistable polymer dispersed liquid crystal devices in different climatic zones.

A black color of the bipolar polymer dispersed liquid crystal film can be achieved both a single dye and by means of additive synthesis of RGB dye components.

High absorption in the UV and near IR spectral ranges provided by both metallomesogen metal complexation and chromophore compositions is characterized by a combination of strong metal complex bond and strong chomophore absorption wavelengths.

MOM-chromophore compositions described herein can be added to liquid crystal guest host solutions used in LCD devices. Large area smart polymer dispersed film or glasses can be used as switchable windows in architecture and automotive industry.

High electro-optical performance of LCD devices based on metallomesogen-chromophore dyes is harmonized with their extended color stability in UV, visible and IR spectral ranges.

Practical applications of the metallomesogen-chromophore-dye technology are in the fields of colored dynamic architectural windows, automotive, marine, aviation, trains and general ground transportation glazing. The use of such glazing products as UV and IR (heat) dynamic absorbers in the abovementioned fields are also in the scope of the present invention. LCD devices based on metallomesogens can be also used as UV and IR switchable absorbing glazing and displays.

In a preferred embodiment, the bistable LC dispersion device can be enclosed between two glasses or may be retrofitted on existing interior and exterior architectural glazing, automotive windows, and other interior glazing. A transparent adhesive may be used to stick the panel to the window, which may be integrated with the panel or separately provided. The panel may also be applied to original windows before installation.

Benefits of Ionic Mesogens as Ionic Dopants

In preferred embodiments of the invention disclosed herein, ionic mesogens, preferably ionic MOMs, and/or eutectic mixtures thereof are incorporated into the LC layer as ionic dopants. Ionic mesogens and eutectic mixtures thereof have several advantages over the ionic dopants used in similar devices known in the art.

Because the ionic mesogens themselves adopt a smectic structure, they can be introduced into the LC device in higher concentrations than other ionic dopants without disrupting the structure of the LC layer. Thus, LC devices disclosed herein can incorporate as the ionic dopant up to 10% ionic mesogen (w/w relative to the weight of the weight of the LC dispersion). This concentration is approximately an order of magnitude greater than that in LC devices known in the art, in which the ionic dopant is typically a long-chain ammonium salt, the concentration of which is generally limited to ~1% (w/w) of the layer comprising the LC dispersion, and is more typically on the order of 0.1%-0.5%; see, for example, Coates, D.; Devey, A. B.; Walker, C. J., *Proc. Eurodisplay London,* 1987, 96, and Büyüktanir, E. A., Electro-Optical Characterization of Bistable Smectic A Liquid Crystal Displays. Ph. D. Thesis, Kent State University: Kent, Ohio, 2008, pp. 58-63.

A second important advantage of ionic mesogens over other types of ionic dopants is that, due to their inherent liquid crystalline structure, ionic mesogens improve the thermal stability and increase the mesogenic range of the smectic phase in a bistable device.

Furthermore, because the ionic mesogens are stacked in the smectic phase, the LC device that incorporates them will have a higher opacity in the opaque state than a similar device that incorporates an ionic dopant of a type known in the art. On the other hand, because the ionic mesogen molecules can insert themselves into the smectic layers of the LC device, in contrast to ionic dopants known in the art, the transparency of the transparent state will be higher in an LC device disclosed herein than in similar devices known in the art. The improvement in the optical qualities in both states of the LC device thus yields a superior device for such uses as "smart windows."

In addition to the benefits due to the LC behavior of the ionic mesogens, preferred embodiments in which MOMs are used have at least one additional advantage over similar devices known in the art. Because MOMs typically incorporate chromophoric groups and are generally in the form of transition metal complexes with low-lying electronic transitions, MOMs typically have strong absorptions in particular bands in the visible spectrum. Ionic MOMs can therefore be used not only as ionic dopants, but as dyes as well, and by proper choice of the MOM, both the color and the intensity of the color of the LC device in the opaque state can readily be controlled.

Controller for Bistable LC Dispersion Device

In order to provide the device disclosed herein with the highest possible level of control, in preferred embodiments of the invention, the film is provided with a unique controller. In some non-limiting embodiments of the invention, the controller is connected to a system or device such as a Smart home system, a wireless device, a PC, etc.

What is claimed is:

1. A bistable liquid crystal film, comprising:
   at least one first transparent flexible film coated with conductive material;
   at least one second transparent flexible conductive film;
   at least one layer of liquid crystal dispersions disposed between said at least one first transparent flexible transparent conductive film and said at least one second transparent flexible conductive film; and, an ionic dopant disposed within said at least one layer of liquid crystal dispersions;
   wherein:
   said bistable liquid crystal film is characterized by two modes, (i) scattering mode-A; and (ii) transparent mode-B;
   switching from one mode to the other is achieved upon application of a voltage pulse, and no further application of voltage is required in order to maintain said layer of liquid crystal dispersions in either said two modes;
   said ionic dopant comprises at least one ionic mesogen; and,
   said at least one layer of liquid crystal dispersions comprises a eutectic mixture of smectic-A liquid crystals.

2. The bistable liquid crystal film according to claim 1, wherein at least one of the following is true:
   switching from said mode-A to said mode-B is achieved upon application of a high frequency voltage pulse; and,
   switching from said mode-B to said mode-A is achieved upon application of a low frequency voltage pulse.

3. The bistable liquid crystal film according to claim 1, wherein said bistable liquid crystal film comprises electrical connections attached to said each of said transparent films.

4. The bistable liquid crystal film according to claim 1, wherein said liquid crystal dispersion is characterized by a liquid crystal dispersion morphology in polymer matrix selected from the group consisting of nano-droplets, micro-droplets, macro-droplets and polymer network.

5. The bistable liquid crystal film according to claim 1, wherein said bistable liquid crystal film comprises a liquid crystal composition selected from the group consisting of Polymer Dispersed Liquid Crystal (PDLC), Polymer Stabilized Liquid Crystal (PSLC), Polymer Network Liquid Crystal (PNLC), and Polymer Stabilized cholesteric Texture (PSCT).

6. The bistable liquid crystal film according to claim 1, wherein said bistable liquid crystal film comprises a figure selected from the group consisting of patterns, low-definition displays, and signage.

7. The bistable liquid crystal film according to claim 1, wherein said liquid crystal film comprises at least one component selected from the group consisting of dichroic metal-organic dyes and dichroic organic dyes.

8. The bistable liquid crystal film according to claim 1, wherein said bistable liquid crystal film comprises at least one metallized film adapted for use in a static solar-reflection mode.

9. The bistable liquid crystal film according to claim 1, wherein said ionic dopant is present in a concentration of 1-10% (w/w) relative to said liquid crystal dispersion.

10. The bistable liquid crystal film according to claim 1, wherein:
    said ionic mesogen is a metal-organic mesogen;
    said metal-organic mesogen comprises at least one chromophoric group and is characterized by at least one absorption band in the visible spectrum; and,
    said metal-organic mesogen acts as both an ionic dopant and as a dye.

11. The bistable liquid crystal film according to claim 1, wherein said at least one ionic mesogen comprises a eutectic mixture selected from the group consisting of:
    eutectic mixtures of ionic mesogens;
    eutectic mixtures of ionic organometallic liquid crystals;
    eutectic mixtures of ionic organometallic liquid crystals and their ligands; and,
    eutectic mixtures of ionic organometallic mesogens and conventional liquid crystals.

12. The bistable liquid crystal film according to claim 1, wherein said flexible transparent conductive film is coated with a reflectivity enhancer.

13. A method of preparing a bistable switchable liquid crystal device, said method comprising:
    providing two transparent flexible substrates, each of which is coated with a transparent conductive layer;
    placing said two transparent flexible substrates opposite one another;
    optionally, separating said two transparent flexible substrates, thereby creating a volume therebetween;
    preparing a dispersion comprising at least one liquid crystal material comprising a eutectic mixture of smectic-A liquid crystals, a monomer that is polymerizable on irradiation or heating, and at least one ionic mesogen;
    introducing said dispersion between said substrates; and,
    polymerizing said polymerizable monomer in the presence of an external electric field, thereby forming a polymer matrix.

14. The method according to claim 13, wherein said at least one ionic mesogen comprises at least one ionic metal-organic mesogen.

15. The method according to claim 13, wherein said at least one ionic mesogen comprises a eutectic mixture of ionic mesogens, said eutectic mixture selected from the group consisting of:
    eutectic mixtures of ionic mesogens;
    eutectic mixtures of ionic organometallic liquid crystals;
    eutectic mixtures of ionic organometallic liquid crystals and their ligands; and,
    eutectic mixtures of ionic organometallic mesogens and conventional liquid crystals.

16. The method according to claim 13, wherein said dispersion comprises 1-10% (w/w) of said at least one ionic mesogen.

17. The method according to claim 13, wherein said method comprises attaching electrical connections to said transparent films.

18. The method according to claim 17, wherein said method comprises connecting said bistable liquid crystal film to a controller, said controller configured to be connected to a device selected from the group consisting of smart home systems, wireless devices, and personal computers.

19. The method according to claim 13, wherein said method comprises coating at least one of said flexible conductive films with a reflectivity enhancer.

20. The bistable liquid crystal film according to claim 1, wherein said ionic mesogen is not a dye.

21. The method according to claim 13, wherein said step of preparing a dispersion comprising at least one liquid crystal material comprising a eutectic mixture of smectic-A liquid crystals, a monomer that is polymerizable on irradiation or heating, and at least one ionic mesogen comprises preparing a dispersion comprising at least one liquid crystal material comprising a eutectic mixture of smectic-A liquid crystals, a monomer that is polymerizable on irradiation or heating, and at least one ionic mesogen that is not a dye.

22. The bistable liquid crystal film according to claim 1, wherein said bistable liquid crystal film does not comprise spacers.

23. The method according to claim 13, wherein said method does not include any step of incorporating spacers into said bistable liquid crystal device.

\* \* \* \* \*